(12) United States Patent
Silverbrook

(10) Patent No.: US 6,416,170 B2
(45) Date of Patent: Jul. 9, 2002

(54) DIFFERENTIAL THERMAL INK JET PRINTING MECHANISM

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 45 days.

(21) Appl. No.: 09/798,416

(22) Filed: Mar. 2, 2001

Related U.S. Application Data

(63) Continuation-in-part of application No. 09/112,754, filed on Jul. 10, 1998, now Pat. No. 6,238,040.

(51) Int. Cl.⁷ .................................................. B41J 2/04
(52) U.S. Cl. ......................................................... 347/54
(58) Field of Search ............................ 347/54, 68, 69, 347/70, 71, 72, 50, 40, 20, 44, 47, 48; 399/261; 361/700; 310/328–330; 29/890.1; 216/4, 48, 27

(56) References Cited

U.S. PATENT DOCUMENTS

| 1,941,001 A | * | 12/1933 | Hansell |
| 3,373,437 A | * | 3/1968 | Sweet et al. |
| 3,596,275 A | * | 7/1971 | Sweet |
| 3,683,212 A | * | 8/1972 | Zolten |
| 3,747,120 A | * | 7/1973 | Stemme |
| 3,946,398 A | * | 3/1976 | Kyser et al. |
| 4,459,601 A | * | 7/1984 | Howkins |
| 4,490,728 A | * | 12/1984 | Vaught et al. |
| 4,584,590 A | * | 4/1986 | Fischbeck et al. |
| 6,087,638 A | * | 7/2000 | Silverbrook |
| 6,171,875 B1 | * | 1/2001 | Silverbrook |
| 6,180,427 B1 | * | 1/2001 | Silverbrook |
| 6,217,183 B1 | * | 4/2001 | Silverbrook |
| 6,220,694 B1 | * | 4/2001 | Silverbrook |
| 6,238,040 B1 | * | 5/2001 | Silverbrook |
| 6,239,821 B1 | * | 5/2001 | Silverbrook |
| 6,243,113 B1 | * | 6/2001 | Silverbrook |
| 6,244,691 B1 | * | 6/2001 | Silverbrook |
| 6,245,247 B1 | * | 6/2001 | Silverbrook |
| 6,247,790 B1 | * | 6/2001 | Silverbrook |
| 6,247,791 B1 | * | 6/2001 | Silverbrook |
| 6,247,792 B1 | * | 6/2001 | Silverbrook |
| 6,247,795 B1 | * | 6/2001 | Silverbrook |
| 6,247,796 B1 | * | 6/2001 | Silverbrook |
| 6,477,794 | * | 6/2001 | Silverbrook |

FOREIGN PATENT DOCUMENTS

JP 404001051 A 1/1992

\* cited by examiner

*Primary Examiner*—Raquel Y. Gordon

(57) ABSTRACT

An ink jet nozzle assembly includes a nozzle chamber having an inlet receiving ink from a reservoir and a nozzle through which the ink can be ejected. The chamber includes a fixed portion and a movable portion configured for relative movement in an ejection phase and alternate relative movement in a refill phase. A pair of spaced apart actuating arms is connected with the movable portion and undergoes differential thermal expansion upon heating to effect periodically the relative movement. The inlet is positioned and dimensioned relative to the nozzle such that ink is ejected preferentially from the chamber through the nozzle in droplet form during the ejection phase, and ink is alternately drawn preferentially into the chamber from the reservoir through the inlet during the refill phase.

18 Claims, 35 Drawing Sheets

DIFFERENTIAL THERMAL INK JET PRINTING MECHANISM

This is a continuation-in-part of application Ser. No. 09/112,754, filed Jul. 10, 1998, now U.S. Pat. No. 6,238,040, issued May 29, 2001.

FIELD OF THE INVENTION

The present invention relates to ink jet printing systems and, in particular, discloses a thermally actuated slotted chamber wall ink jet printer.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nobles has become increasingly popular primarily due to its inexpensive and versatile nature.

Many different techniques on ink jet printing have been invented. For a survey of the field, reference is made to an article by J Moore, "Non-lmpact Printing: Introduction and Historical Perspective", Output Hard Copy Devices, Editors R Dubeck and S Sherr, pages 207–220 (1988).

Ink Jet printers themselves come in many different types. The utilisation of a continuous stream of ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of continuous ink jet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, by Stemme in U.S. Pat. No. 3,747,120 (1972) which discloses a bend mode of piezoelectric operation, by Howkins in U.S. Pat. No. 4,459,601 which discloses a Piezoelectric push mode actuation of the ink jet stream and by Fischbeck in U.S. Pat. No. 4,584,590 which discloses a sheer mode type of piezoelectric transducer element.

Recently, thermal ink jet printing has become an extremely popular form of ink jet printing. The ink jet printing techniques include those disclosed by Endo et al in GB 2007162 (1979) and by Vaught et al in U.S. Pat. No. 4,490,728. Both the aforementioned referenced ink jet printing techniques rely upon the activation of an electrothermal actuator which results in the creation of a bubble in a constricted space, such as a nozzle, which thereby causes the ejection of ink from an aperture in communication with the confined space onto a relevant print media. Printing devices utilizing the electrothermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction, operation, durability and consumables.

SUMMARY OF THE INVENTION

There is disclosed herein an ink jet nozzle assembly including a nozzle chamber having a nozzle, the chamber including a movable portion configured for movement to effect ejection of ink from the chamber via said nozzle, and a pair of actuating arms attached to or formed integrally with the movable portion, the arms effecting movement of said movable portion as a result of one of said arms being periodically hotter than the other said arm in use.

There are many ways in which one of the arms can be made hotter than the other in use. For example, the hotter arm could have less heat sinking than the other arm. The cold arm could be in cooling water, whereas the hot arm might not be in the water. The hotter arm might have lower mass than the colder arm. A greater current might be passed through one arm making it hotter than the other. The arm to be made hotter might have greater resistance than the other arm. More electrical power might be applied to one arm, thus making it hotter than the other, or the arm to be made hotter might have more thermal insulation applied to it.

There is further disclosed herein an ink jet nozzle assembly including: a nozzle chamber having an inlet in fluid communication with an ink reservoir and a nozzle through which ink from the chamber can be ejected;

the chamber including a fixed portion and a movable portion configured for relative movement in an ejection phase and alternate relative movement in a refill phase;

a pair of spaced apart actuating arms connected with the movable portion and undergoing differential thermal expansion upon heating to effect periodically said relative movement; and the inlet being positioned and dimensioned relative to the nozzle such that ink is ejected preferentially from the chamber through the nozzle in droplet form during the ejection phase, and ink is alternately drawn preferentially into the chamber from the reservoir through the inlet during the refill phase.

Preferably the movable portion includes the nozzle and the fixed portion is mounted on a substrate.

Preferably the fixed portion includes the nozzle mounted on a substrate and the movable portion includes an ejection paddle.

Preferably the arms extend between the paddle and the substrate.

Preferably the arms are located substantially within the chamber.

Alternately the arms are located substantially outside the chamber.

Preferably the fixed portion includes a slot a sidewall of the chamber through which the arms are connected to the paddle.

Preferably the arms are of substantially the same cross-sectional profile relative to one another.

Alternatively the arms are of differing cross-sectional profile relative to one another.

Preferably the arms are heated simultaneously.

Preferably one arm is heated to a higher temperature than the other arm.

Preferably the arms are of substantially the same material composition relative to one another.

Alternatively the arms are of substantially different material composition relative to one another.

Preferably the aims are substantially parallel to one another.

Alternatively the aims are substantially non-parallel to one another.

Preferably the assembly is manufactured using micro-electro-mechanical systems (MEMS) techniques.

Preferably an effective volume of the chamber is reduced in said ejection phase and enlarged in said refill phase.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, there is provided an ink jet printing system wherein each nozzle has a nozzle chamber having a slotted side wall through which is formed an actuator mechanism attached to a vane within the nozzle chamber such that the actuator can be activated to move the vane within the nozzle chamber to thereby cause ejection of ink from the nozzle chamber.

Figure 1:
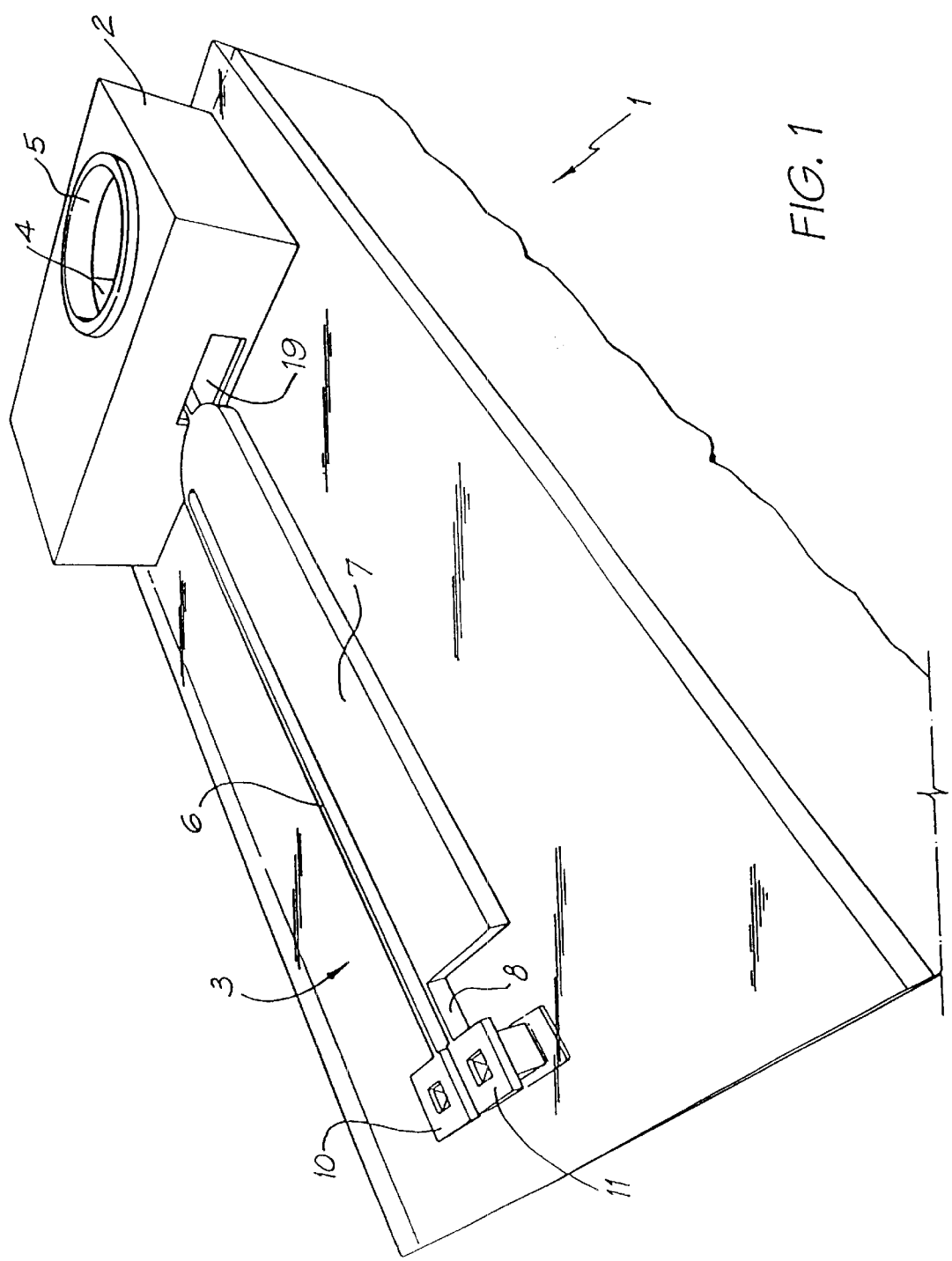
FIG. 1 illustrates a perspective view of an ink jet nozzle arrangement in accordance with the preferred embodiment.

Turning now to the figures, there is illustrated in FIG. 1 an example of an ink jet nozzle arrangement 1 as constructed in accordance with the preferred embodiment. The nozzle arrangement includes a nozzle chamber 2 normally filled with ink and an actuator mechanism 3 for actuating a vane 4 for the ejection of ink from the nozzle chamber 2 via an ink ejection port 5.

Figure 2:
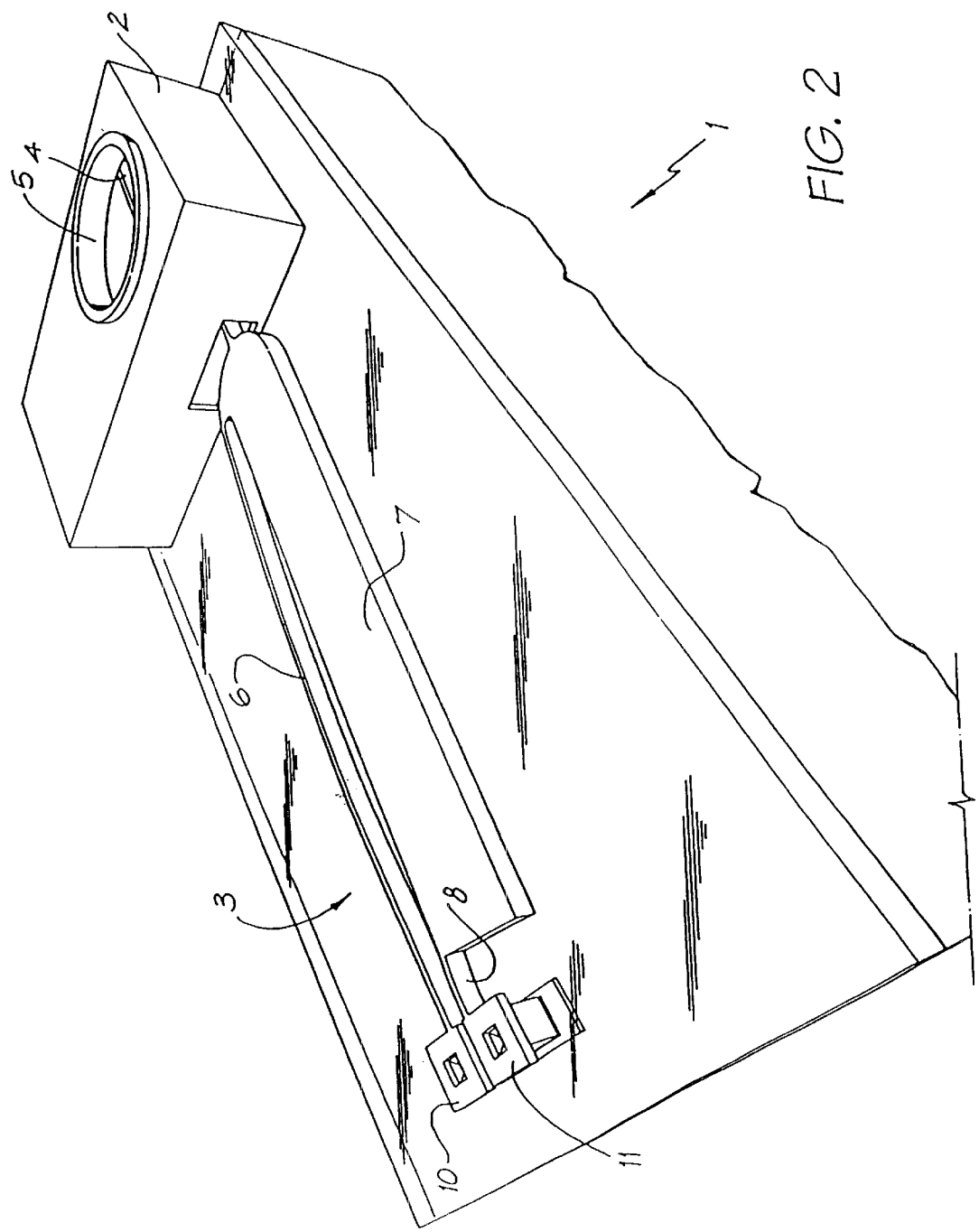
FIG. 2 illustrates the arrangement of FIG. 1 when the actuator is in an activated position.

FIG. 1 is a perspective view of the ink jet nozzle arrangement of the preferred embodiment in its idle or quiescent position. FIG. 2 illustrates a perspective view after actuation of the actuator 3.

The actuator 3 includes two arms 6, 7. The two arms can be formed from titanium di-boride ($TiB_2$) which has a high Young's modulus and therefore provides a large degree of bending strength. A current is passed along the arms 6, 7 with the arm 7 having a substantially thicker portion along most of its length. The arm 7 is stiff but for in the area of thinned portion 8 and hence the bending moment is concentrated in the area 8. The thinned arm 6 is of a thinner form and is heated by means of resistive heating of a current passing through the arms 6, 7. The arms 6, 7 are interconnected with electrical circuitry via connections 10, 11.

Upon heating of the arm 6, the arm 6 is expanded with the bending of the arm 7 being concentrated in the area 8. This results in movement of the end of the actuator mechanism 3 which proceeds through a slot 19 in a wall of the nozzle chamber 2. The bending further causes movement of vane 4 so as to increase the pressure of the ink within the nozzle chamber and thereby cause its subsequent ejection from ink ejection port 5. The nozzle chamber 2 is refilled via an ink channel 13 (FIG. 3) formed in a wafer substrate 14. After movement of the vane 4, so as to cause the ejection of ink, the current to arm 6 is turned off which results in a corresponding back movement of the vane 4. The ink within nozzle chamber 2 is then replenished by means of wafer ink supply channel 13 which is attached to an ink supply formed on the back of wafer 14. The refill can be by means of a surface tension reduction effect of the ink within nozzle chamber 2 across ink ejection port 5.

Figure 3:
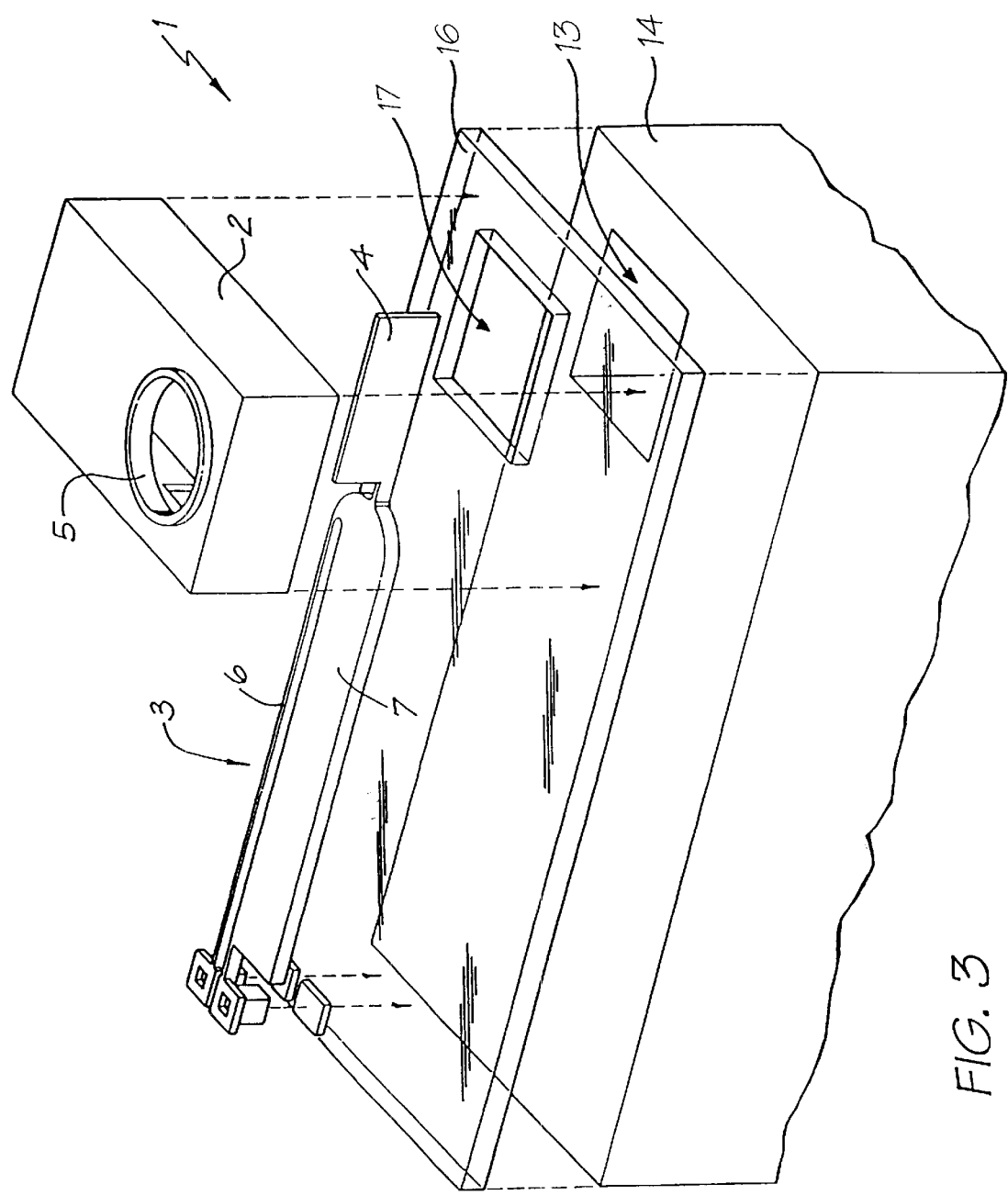
FIG. 3 illustrates an exploded perspective view of the major components of the preferred embodiment.

FIG. 3 illustrates an exploded perspective view of the components of the ink jet nozzle arrangement.

Referring now specifically to FIG. 3, the preferred embodiment can be constructed utilizing semiconductor processing techniques in addition to micro machining and micro fabrication process technology (MEMS) and a full familiarity with these technologies is hereinafter assumed.

For a general introduction to a micro-electro mechanical system (MEMS) reference is made to standard proceedings in this field including the proceeding of the SPIE (International Society for Optical Engineering) including volumes 2642 and 2882 which contain the proceedings of recent advances and conferences in this field.

The nozzles can preferably be constructed by constructing a large array of nozzles on a single silicon wafer at a time. The array of nozzles can be divided into multiple printheads, with each printhead itself having nozzles grouped into multiple colors to provide for full color image reproduction. The arrangement can be constructed via the utilization of a standard silicon wafer substrate 14 upon which is deposited an electrical circuitry layer 16 which can comprise a standard CMOS circuitry layer. The CMOS layer can include an etched portion defining pit 17. On top of the CMOS layer is initially deposited a protective layer (not shown) which comprise silicon nitride or the like. On top of this layer is deposited a sacrificial material which is initially suitably etched so as to form cavities for the portion of the thermal actuator 3 and bottom portion of the vane 4, in addition to the bottom rim of nozzle chamber 2. These cavities can then be filled with titanium di-boride. Next, a similar process is used to form the glass portions of the actuator. Next, a further layer of sacrificial material is deposited and suitably etched so as to form the rest of the vane 4 in addition to a portion of the nozzle chamber walls to the same height of vane 4.

Subsequently, a further sacrificial layer is deposited and etched in a suitable manner so as to form the rest of the nozzle chamber 2. The top surface of the nozzle chamber is further etched so as to form the nozzle rim rounding the ejection port 5. Subsequently, the sacrificial material is etched away so as to release the construction of the preferred embodiment. It will be readily evident to those skilled in the art that other MEMS processing steps could be utilized.

Preferably, the thermal actuator and vane portions 3 and 4 in addition to the nozzle chamber 2 are constructed from titanium di-boride. The utilization of titanium di-boride is standard in the construction of semiconductor systems and, in addition, its material properties, including a high Young's modulus, is utilized to advantage in the construction of the thermal actuator 3.

Further, preferably the actuator 3 is covered with a hydrophobic material, such as Teflon, so as to prevent any leaking of the liquid out of the slot 19.

Further, as a final processing step, the ink channel can be etched through the wafer utilizing a high anisotropic silicon wafer etch. This can be done as an anisotropic crystallographic silicon etch, or an anisotropic dry etch. A dry etch system capable of high aspect ratio deep silicon trench etching such as the Surface Technology Systems (STS) Advance Silicon Etch (ASE) system is recommended for volume production, as the chip size can be reduced over a wet etch. The wet etch is suitable for small volume production where a suitable plasma etch system is not available. Alternatively, but undesirably, ink access can be around the sides of the printhead chips. If ink access is through the wafer higher ink flow is possible, and there is less requirement for high accuracy assembly. If ink access is around the edge of the chip, ink flow is severely limited, and a the printhead chips must be carefully assembled onto ink channel chips. This latter process is difficult due to the possibility of damaging the fragile nozzle plate. If plasma etching is used, the chips can be effectively diced at the same time. Separating the chips by plasma etching allows them to be spaced as little as 35 µm apart, increasing the number of chips on a wafer.

Figure 4:
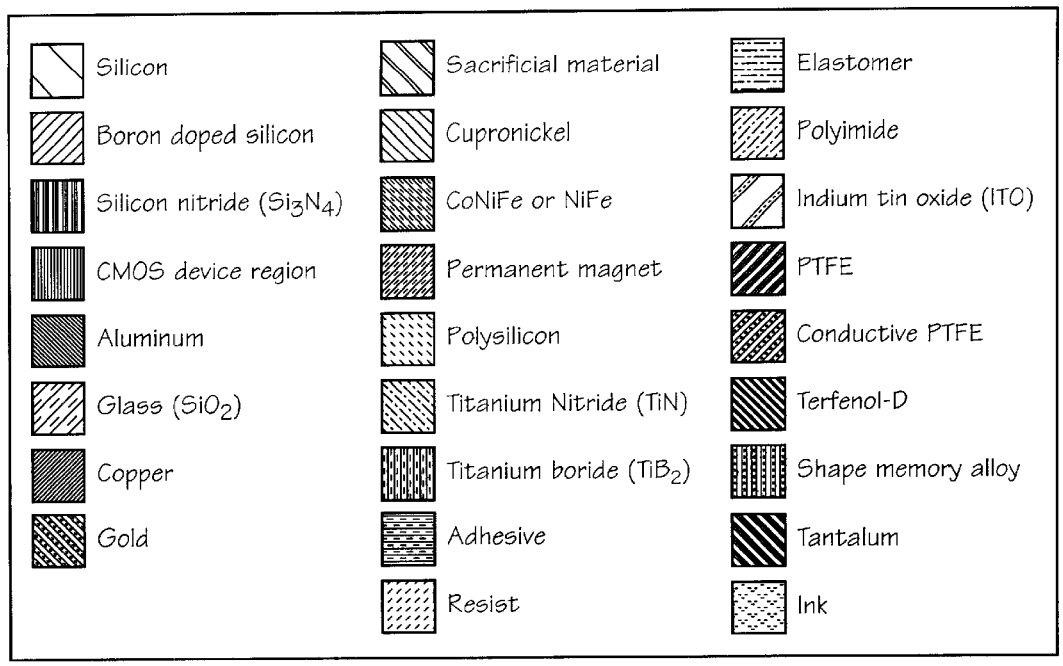
FIG. 4 provides a legend of the materials indicated in FIGS. 5 to 16.
Figure 5:
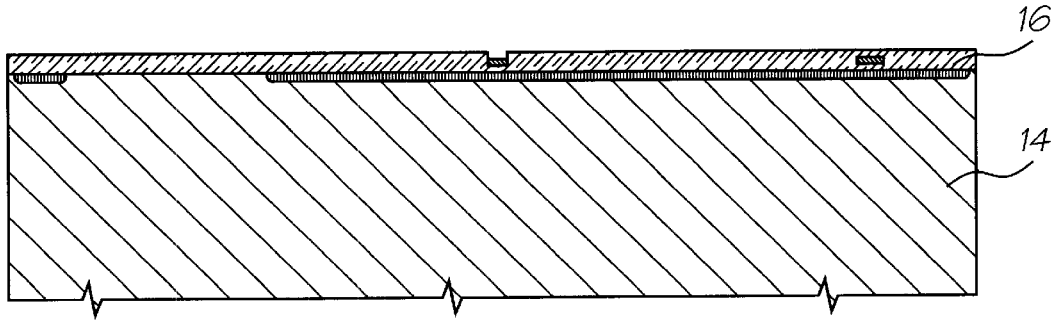
FIGS. 5 to 16 illustrate sectional views of the manufacturing steps in one form of construction of an ink jet printhead nozzle.

One form of detailed manufacturing process which can be used to fabricate monolithic ink jet print heads operating in accordance with the principles taught by the present embodiment can proceed utilizing the following steps:

1. Using a double sided polished wafer, complete drive transistors, data distribution, and timing circuits using a 0.5 micron, one poly, 2 metal CMOS process. Relevant features of the wafer at this step are shown in FIG. 5. For clarity, these diagrams may not be to scale, and may not represent a cross section though any single plane of the nozzle. FIG. 4 is a key to representations of various materials in these manufacturing diagrams, and those of other cross referenced ink jet configurations.

Figure 6:
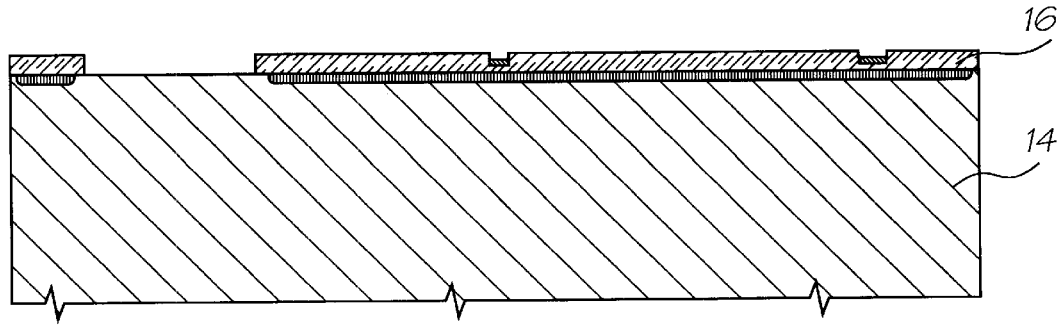

2. Etch oxide down to silicon or aluminum using Mask 1. This mask defines the ink inlet, the heater contact vias, and the edges of the printhead chips. This step is shown in FIG. 6.

3. Deposit 1 micron of sacrificial material 21 (e.g. aluminum)

Figure 7:
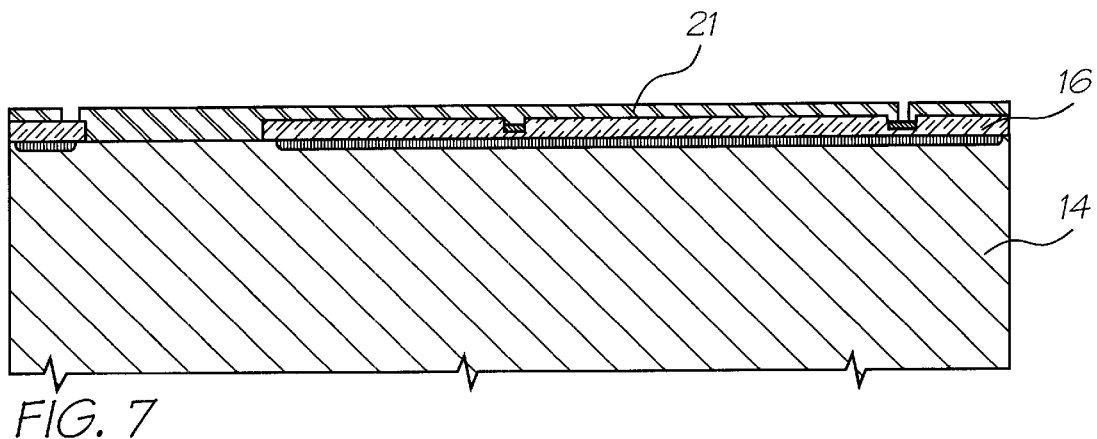

4. Etch the sacrificial layer 21 using Mask 2, defining the nozzle chamber wall and the actuator anchor point. This step is shown in FIG. 7.

5. Deposit 1 micron of heater material 22, for example titanium nitride (TiN) or titanium diboride (TiB$_2$).

Figure 8:
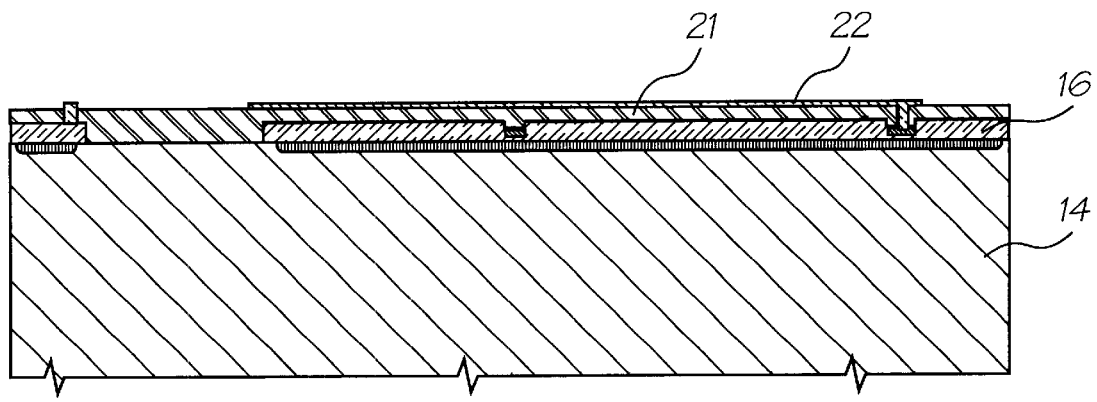

6. Etch the heater material 22 using Mask 3, which defines the actuator loop and the lowest layer of the nozzle wall. This step is shown in FIG. 8.

7. Wafer probe. All electrical connections are complete at this point, bond pads are accessible, and the chips are not yet separated.

8. Deposit 1 micron of titanium nitride 23.

Figure 9:
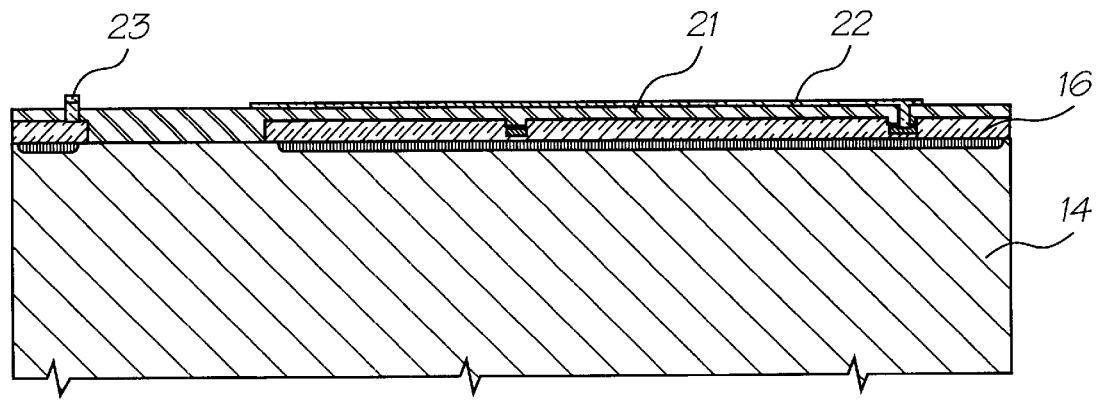

9. Etch the titanium nitride 23 using Mask 4, which defines the nozzle chamber wall, with the exception of the nozzle chamber actuator slot, and the paddle. This step is shown in FIG. 9.

10. Deposit 8 microns of sacrificial material 24.

Figure 10:
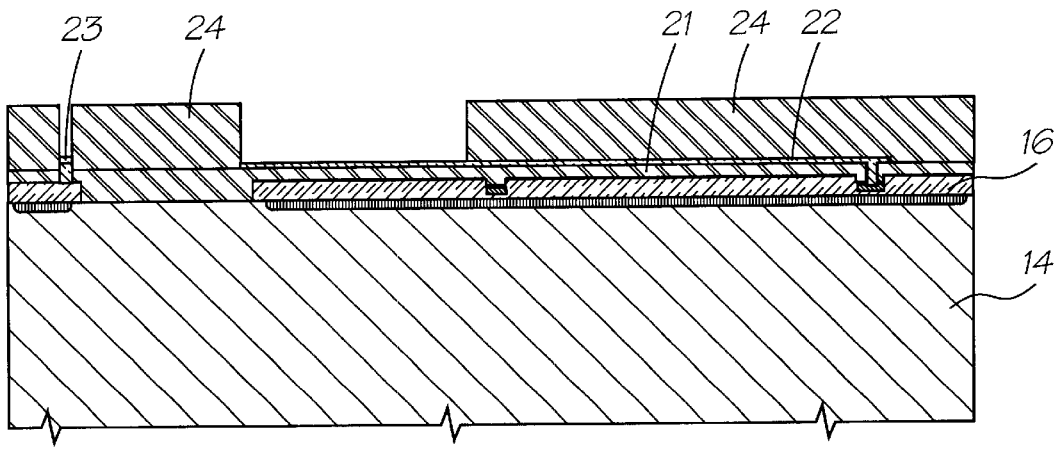

11. Etch the sacrificial material 24 down to titanium nitride 23 using Mask 5. This mask defines the nozzle chamber wall and the paddle. This step is shown in FIG. 10.

12. Deposit a 0.5 micron conformal layer of titanium nitride 25 and planarize down to the sacrificial layer using CMP.

13. Deposit 1 micron of sacrificial material 26.

Figure 11:
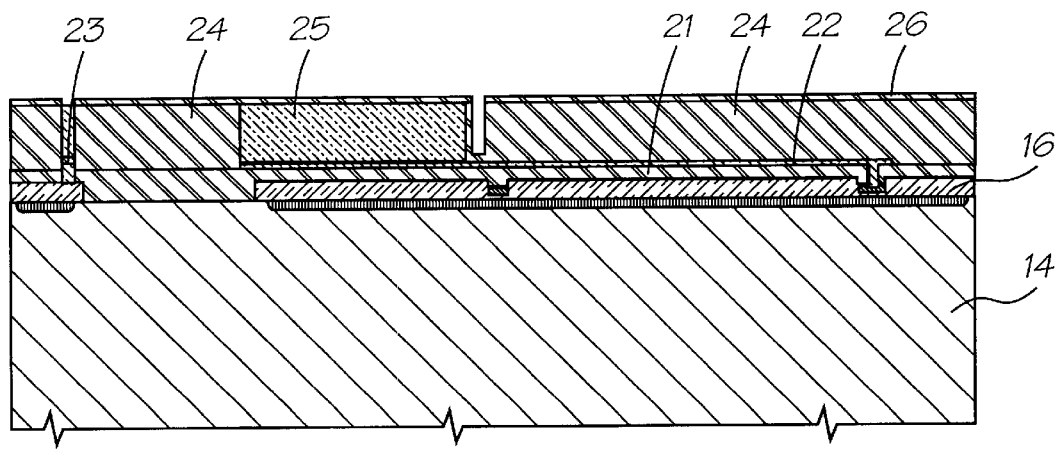

14. Etch the sacrificial material 26 down to titanium nitride 25 using Mask 6. This mask defines the nozzle chamber wall. This step is shown in FIG. 11.

15. Deposit 1 micron of titanium nitride 27.

Figure 12:
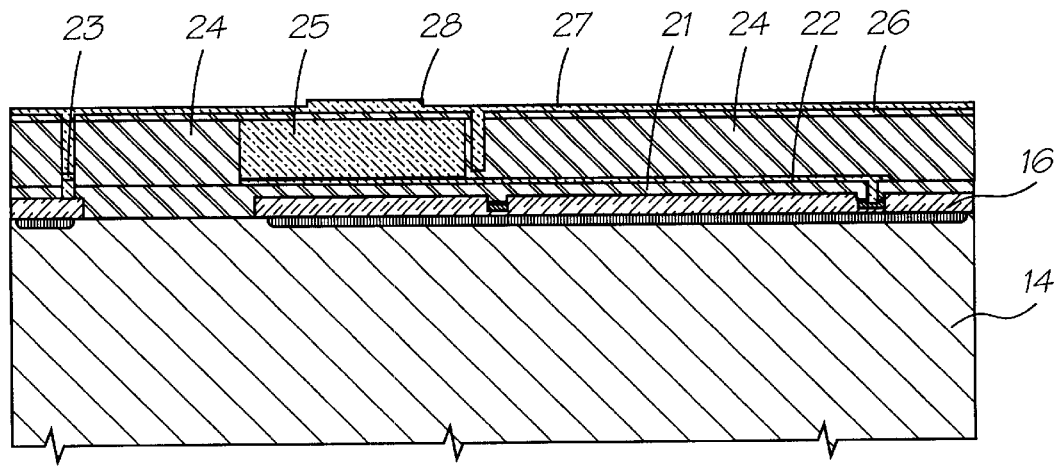

16. Etch to a depth of (approx.) 0.5 micron using Mask 7. This mask defines the nozzle rim 28. This step is shown in FIG. 12.

Figure 13:
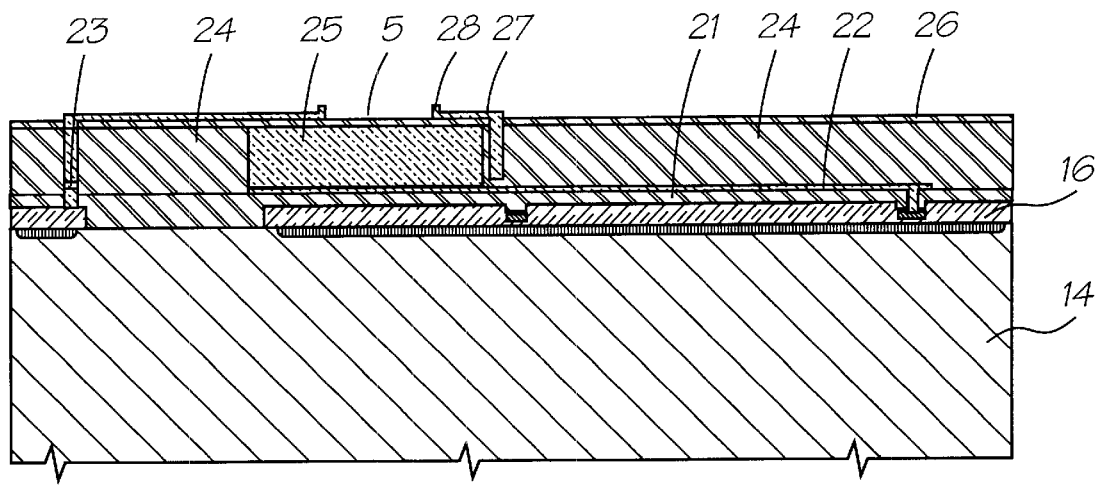

17. Etch down to the sacrificial layer 26 using Mask 8. This mask defines the roof of the nozzle chamber 2, and the port 5. This step is shown in FIG. 13.

Figure 14:
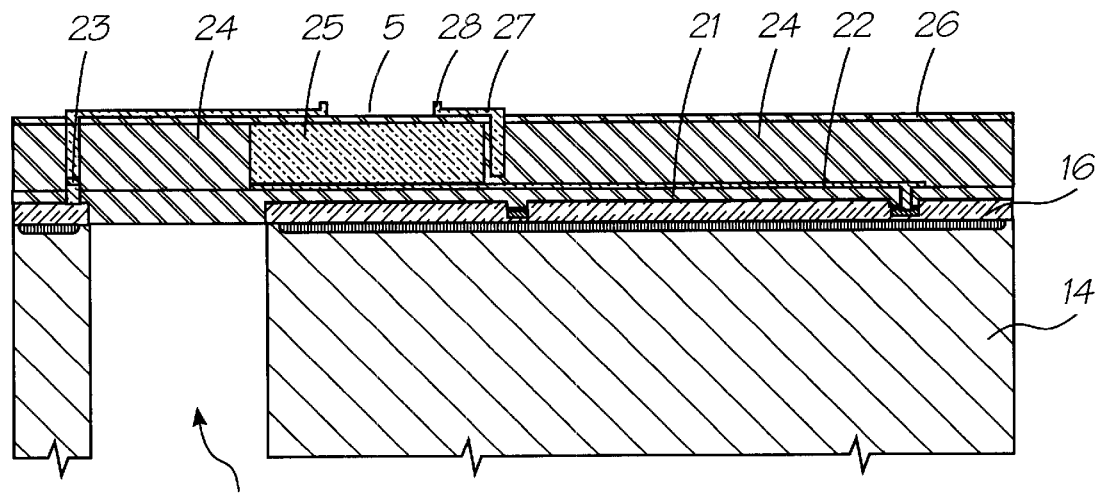

18. Back-etch completely through the silicon wafer 14 (with, for example, an ASE Advanced Silicon Etcher from Surface Technology Systems) using Mask 9. This mask defines the ink inlets which are etched through the wafer 14. The wafer 14 is also diced by this etch. This step is shown in FIG. 14.

Figure 15:
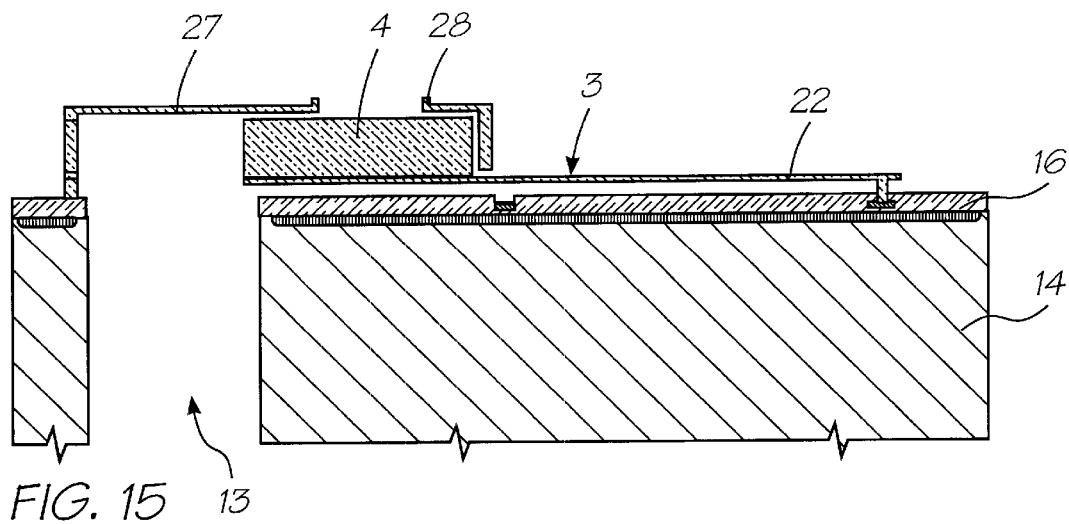

19. Etch the sacrificial material 24. The nozzle chambers 2 are cleared, the actuators 3 freed, and the chips are separated by this etch. This step is shown in FIG. 15.

20. Mount the printheads in their packaging, which may be a molded plastic former incorporating ink channels which supply the appropriate color ink to the ink inlets at the back of the wafer.

21. Connect the printheads to their interconnect systems. For a low profile connection with minimum disruption of airflow, TAB may be used. Wire bonding may also be used if the printer is to be operated with sufficient clearance to the paper.

22. Hydrophobize the front surface of the printheads.

Figure 16:
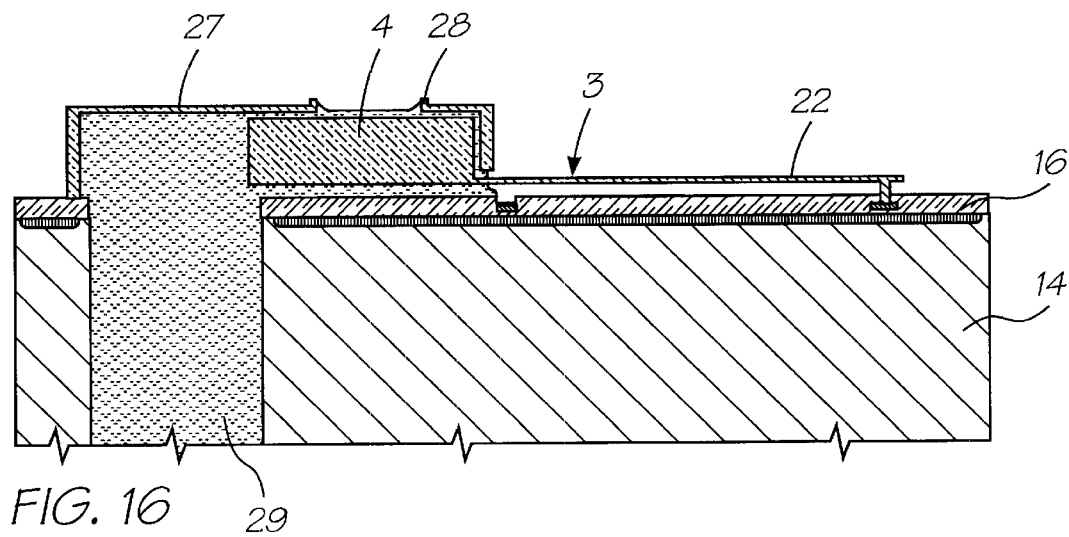

23. Fill the completed printheads with ink 29 and test them. A filled nozzle is shown in FIG. 16.

Figure 17:
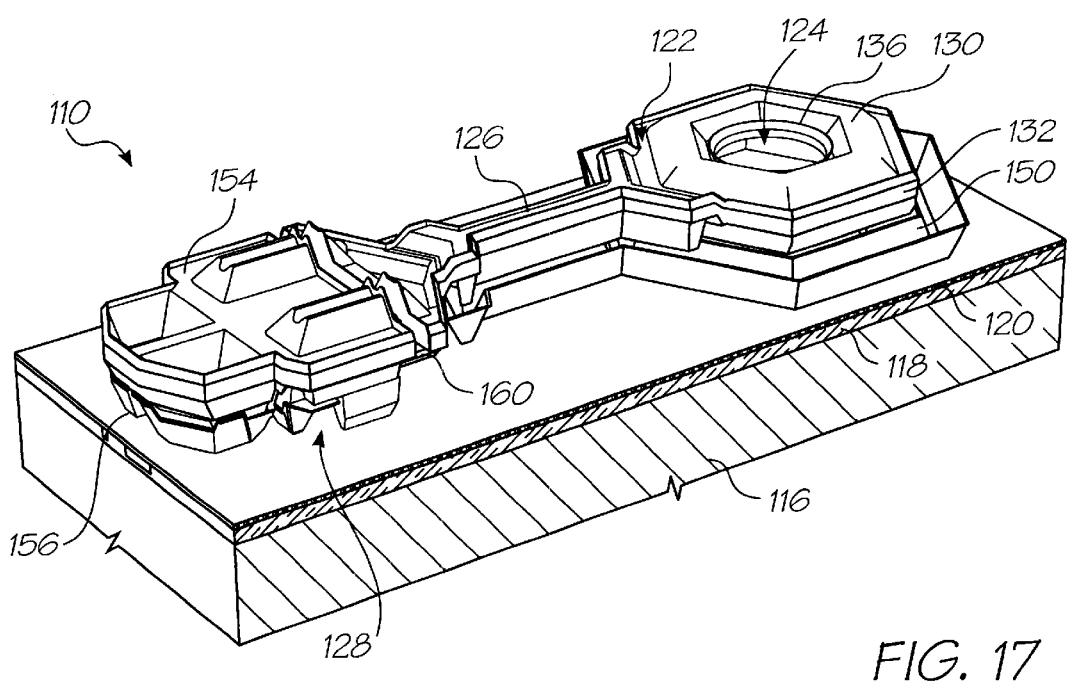
FIG. 17 shows a three dimensional, schematic view of a nozzle assembly for an ink jet printhead in accordance with the invention.

Referring now to FIG. 17 of the drawings, a nozzle assembly, in accordance with a further embodiment of the invention is designated generally by the reference numeral 110. An ink jet printhead has a plurality of nozzle assemblies 110 arranged in an array 114 (FIGS. 21 and 22) on a silicon substrate 116. The array 114 will be described in greater detail below.

The assembly 110 includes a silicon substrate or wafer 116 on which a dielectric layer 118 is deposited. A CMOS passivation layer 120 is deposited on the dielectric layer 118.

Each nozzle assembly 110 includes a nozzle 122 defining a nozzle opening 124, a connecting member in the form of a lever arm 126 and an actuator 128. The lever arm 126 connects the actuator 128 to the nozzle 122.

Figure 18:
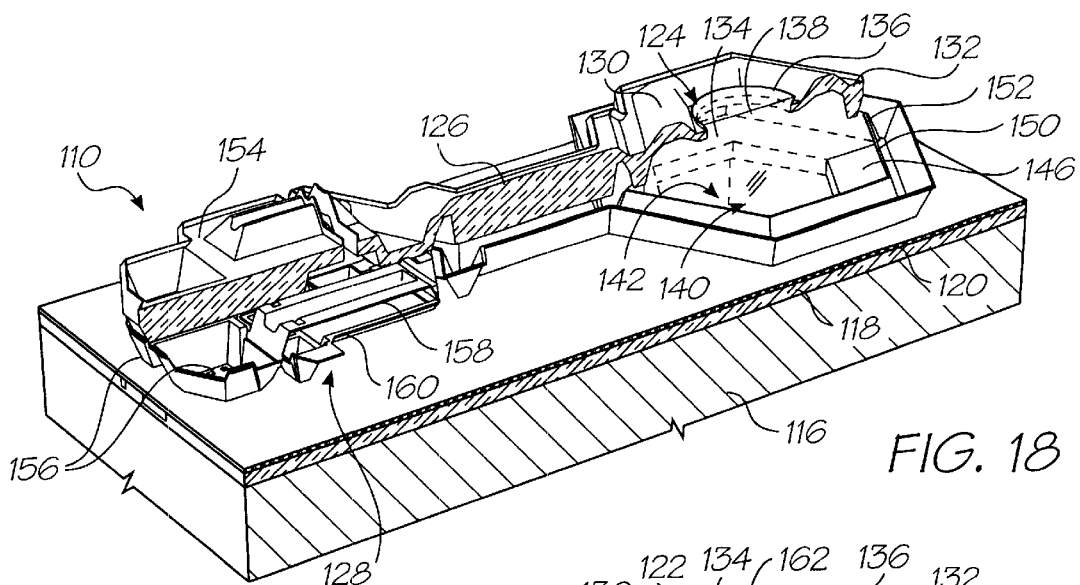
FIGS. 18 to 20 show a three dimensional, schematic illustration of an operation of the nozzle assembly of FIG. 17.
Figure 19:
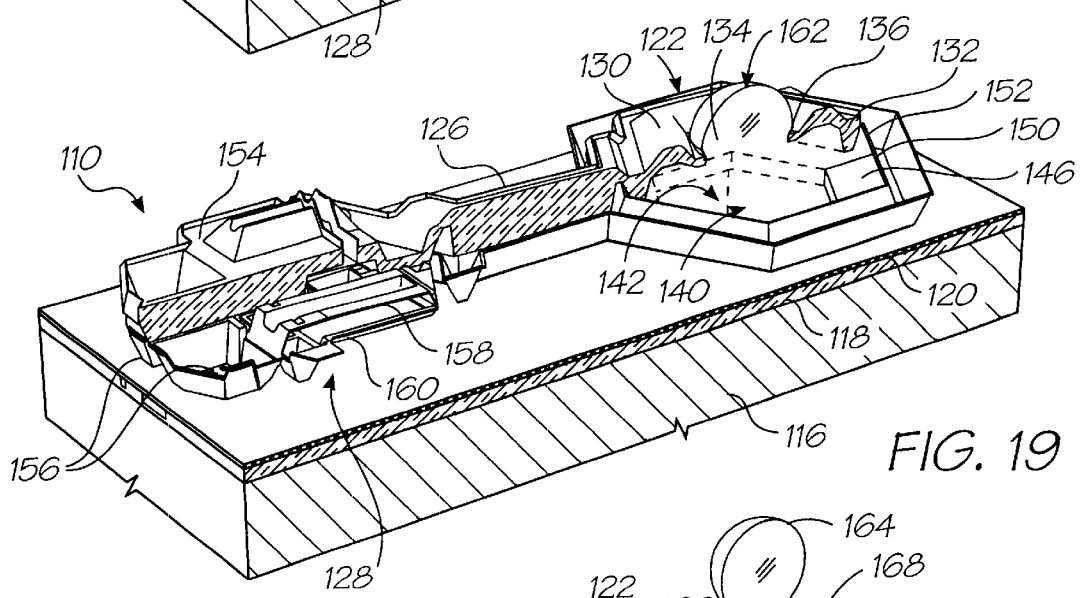
Figure 20:
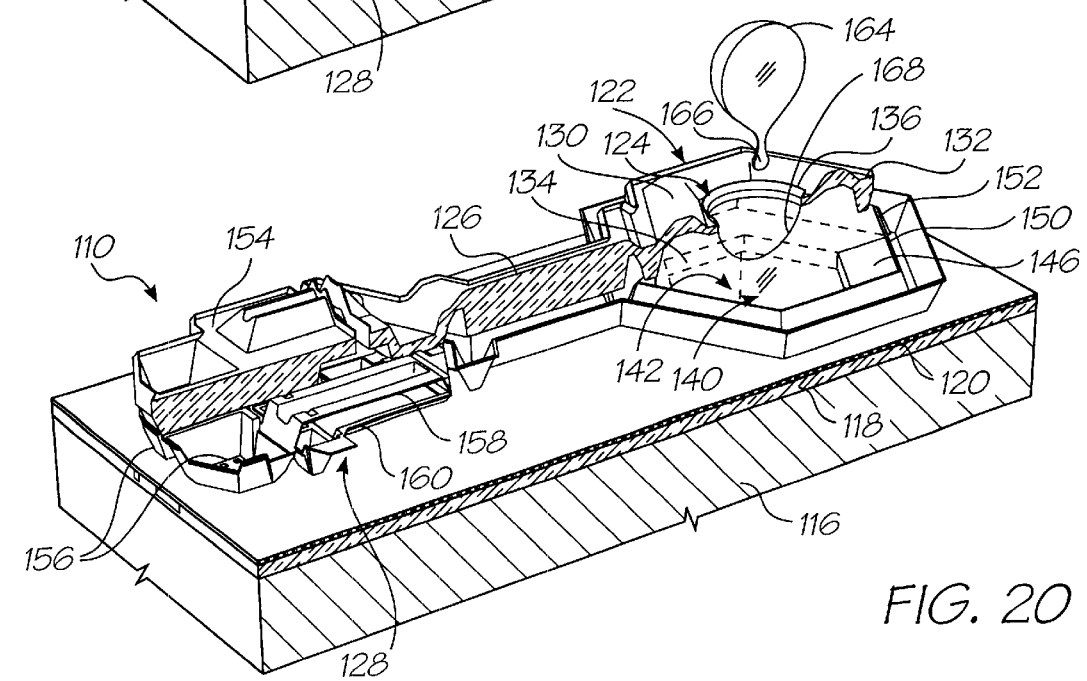

As shown in greater detail in FIGS. 18 to 20 of the drawings, the nozzle 122 comprises a crown portion 130 with a skirt portion 132 depending from the crown portion 130. The skirt portion 132 forms part of a peripheral wall of a nozzle chamber 134 (FIGS. 18 to 20 of the drawings). The nozzle opening 124 is in fluid communication with the nozzle chamber 134. It is to be noted that the nozzle opening 124 is surrounded by a raised rim 136 which "pins" a meniscus 138 (FIG. 18) of a body of ink 140 in the nozzle chamber 134.

An ink inlet aperture 142 (shown most clearly in FIG. 22 of the drawing) is defined in a floor 146 of the nozzle chamber 134. The aperture 142 is in fluid communication with an ink inlet channel 148 defined through the substrate 116.

A wall portion 150 bounds the aperture 142 and extends upwardly from the floor portion 146. The skirt portion 132, as indicated above, of the nozzle 122 defines a first part of a peripheral wall of the nozzle chamber 134 and the wall portion 150 defines a second part of the peripheral wall of the nozzle chamber 134.

The wall 150 has an inwardly directed lip 152 at its free end which serves as a fluidic seal which inhibits the escape of ink when the nozzle 122 is displaced, as will be described in greater detail below. It will be appreciated that, due to the viscosity of the ink 140 and the small dimensions of the spacing between the lip 152 and the skirt portion 132, the inwardly directed lip 152 and surface tension function as a seal for inhibiting the escape of ink from the nozzle chamber 134.

The actuator 128 is a thermal bend actuator and is connected to an anchor 154 extending upwardly from the substrate 116 or, more particularly, from the CMOS passivation layer 120. The anchor 154 is mounted on conductive pads 156 which form an electrical connection with the actuator 128.

The actuator 128 comprises a first, active beam 158 arranged above a second, passive beam 160. In a preferred embodiment, both beams 158 and 160 are of, or include, a conductive ceramic material such as titanium nitride (TiN).

Both beams 158 and 160 have their first ends anchored to the anchor 154 and their opposed ends connected to the arm 126. When a current is caused to flow through the active beam 158 thermal expansion of the beam 158 results. As the passive beam 160, through which there is no current flow, does not expand at the same rate, a bending moment is created causing the arm 126 and, hence, the nozzle 122 to be displaced downwardly towards the substrate 116 as shown in FIG. 19 of the drawings. This causes an ejection of ink through the nozzle opening 124 as shown at 162 in FIG. 19 of the drawings. When the source of heat is removed from the active beam 158, i.e. by stopping current flow, the nozzle 122 returns to its quiescent position as shown in FIG. 20 of the drawings. When the nozzle 122 returns to its quiescent position, an ink droplet 164 is formed as a result of the breaking of an ink droplet neck as illustrated at 166 in FIG. 20 of the drawings. The ink droplet 164 then travels on to the print media such as a sheet of paper. As a result of the formation of the ink droplet 164, a "negative" meniscus is formed as shown at 168 in FIG. 20 of the drawings. This "negative" meniscus 168 results in an inflow of ink 140 into the nozzle chamber 134 such that a new meniscus 138 (FIG. 18) is formed in readiness for the next ink drop ejection from the nozzle assembly 110.

Figure 21:
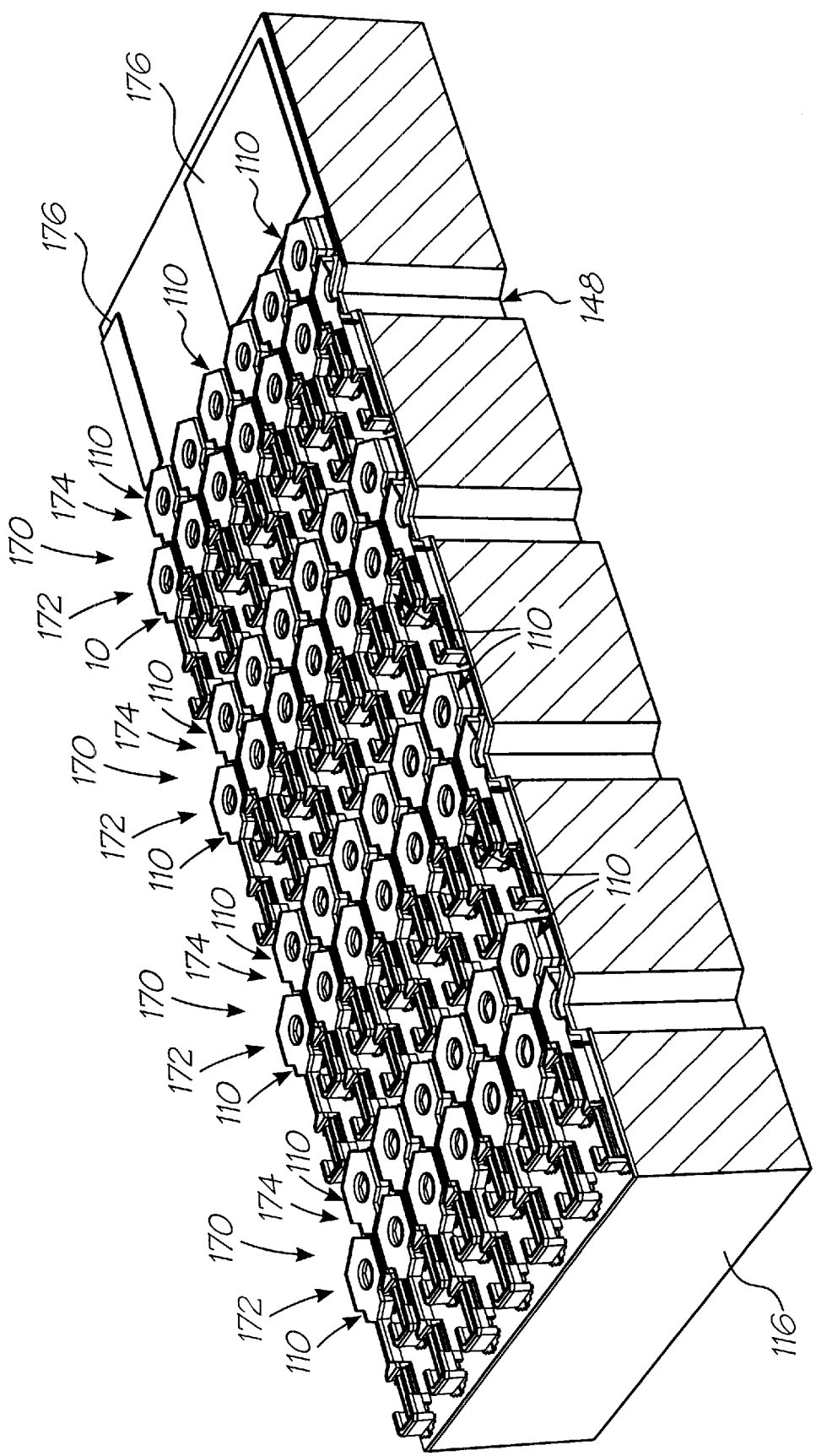
FIG. 21 shows a three dimensional view of a nozzle array constituting an ink jet printhead.
Figure 22:
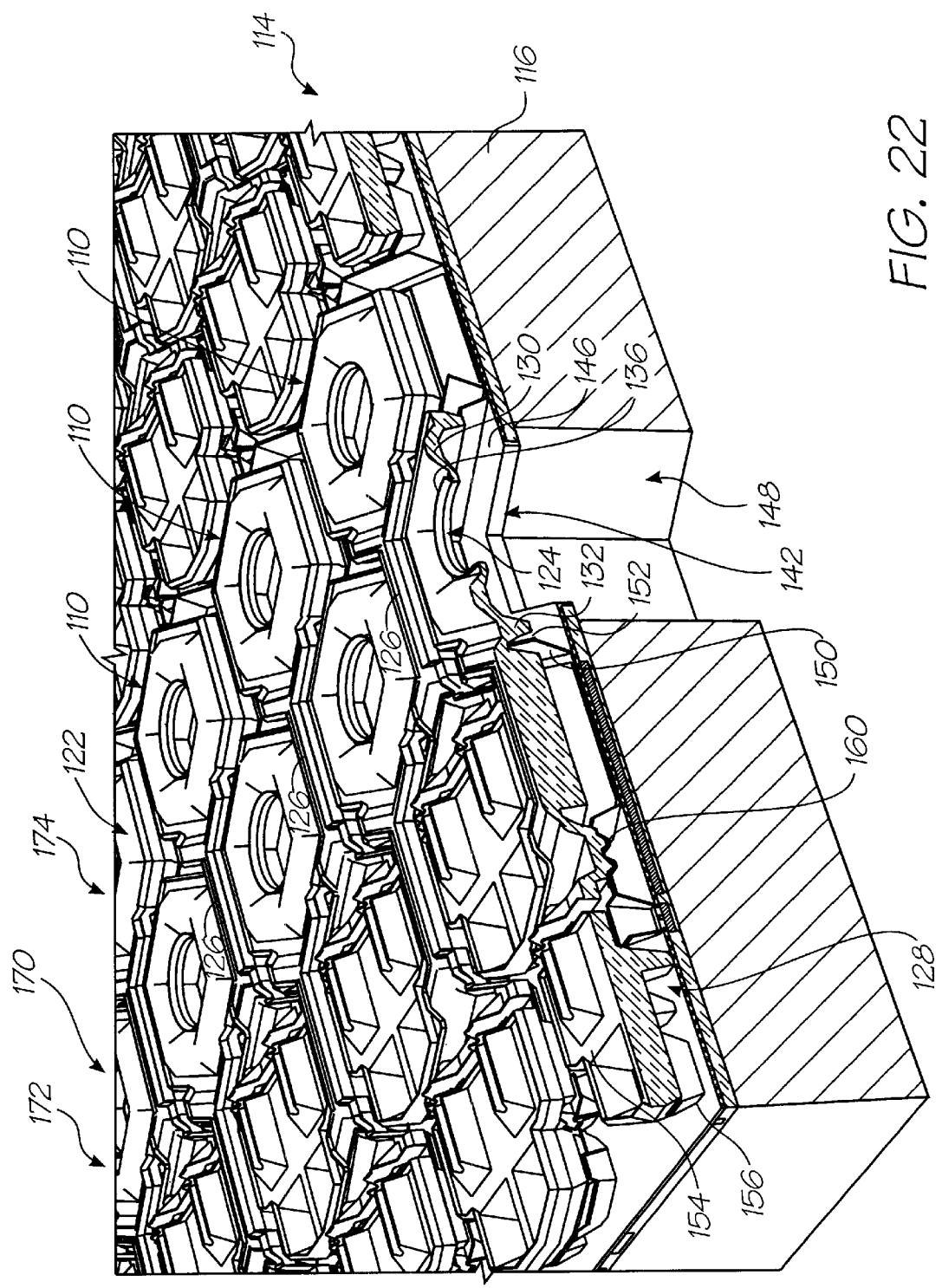
FIG. 22 shows, on an enlarged scale, part of the array of FIG. 21.

Referring now to FIGS. 21 and 22 of the drawings, the nozzle array 114 is described in greater detail. The array 114 is for a four color printhead. Accordingly, the array 114 includes four groups 170 of nozzle assemblies, one for each color. Each group 170 has its nozzle assemblies 110 arranged in two rows 172 and 174. One of the groups 170 is shown in greater detail in FIG. 22 of the drawings.

To facilitate close packing of the nozzle assemblies 110 in the rows 172 and 174, the nozzle assemblies 110 in the row 174 are offset or staggered with respect to the nozzle assemblies 110 in the row 172. Also, the nozzle assemblies 110 in the row 172 are spaced apart sufficiently far from each other to enable the lever arms 126 of the nozzle assemblies 110 in the row 174 to pass between adjacent nozzles 122 of the assemblies 110 in the row 172. It is to be noted that each nozzle assembly 110 is substantially dumbbell shaped so that the nozzles 122 in the row 172 nest between the nozzles 122 and the actuators 128 of adjacent nozzle assemblies 110 in the row 174.

Further, to facilitate close packing of the nozzles 122 in the rows 172 and 174, each nozzle 122 is substantially hexagonally shaped.

It will be appreciated by those skilled in the art that, when the nozzles 122 are displaced towards the substrate 116, in use, due to the nozzle opening 124 being at a slight angle with respect to the nozzle chamber 134 ink is ejected slightly off the perpendicular. It is an advantage of the arrangement shown in FIGS. 21 and 22 of the drawings that the actuators 128 of the nozzle assemblies 110 in the rows 172 and 174 extend in the same direction to one side of the rows 172 and 174. Hence, the ink droplets ejected from the nozzles 122 in the row 172 and the ink droplets ejected from the nozzles 122 in the row 174 are parallel to one another resulting in an improved print quality.

Also, as shown in FIG. 21 of the drawings, the substrate 116 has bond pads 176 arranged thereon which provide the electrical connections, via the pads 156, to the actuators 128 of the nozzle assemblies 110. These electrical connections are formed via the CMOS layer (not shown).

Figure 23:
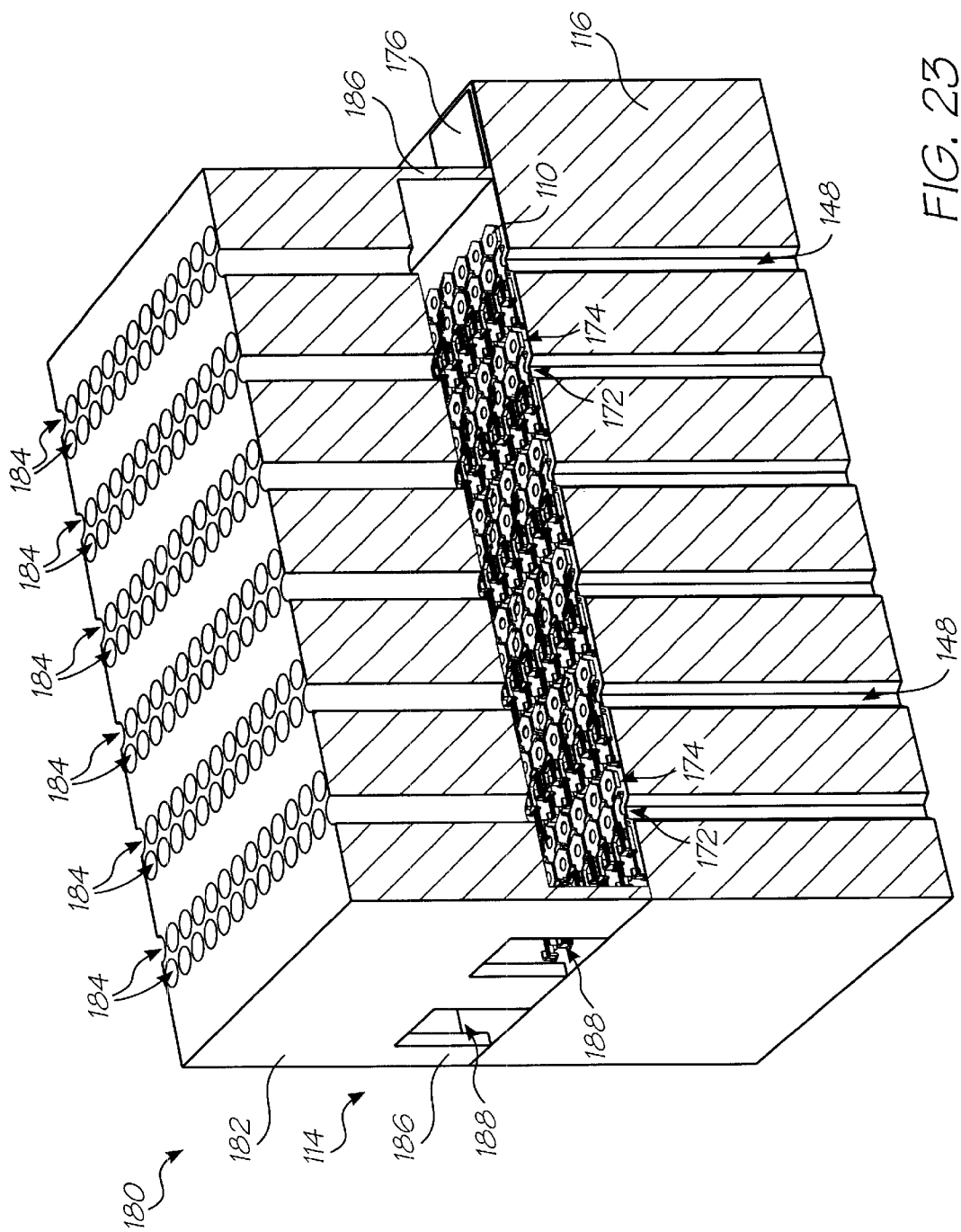
FIG. 23 shows a three dimensional view of an ink jet printhead including a nozzle guard.

Referring to FIG. 23 of the drawings, a development of the invention is shown. With reference to the previous drawings, like reference numerals refer to like parts, unless otherwise specified.

In this development, a nozzle guard 180 is mounted on the substrate 116 of the array 114. The nozzle guard 180 includes a body member 182 having a plurality of passages 184 defined therethrough. The passages 184 are in register with the nozzle openings 124 of the nozzle assemblies 110 of the array 114 such that, when ink is ejected from any one of the nozzle openings 124, the ink passes through the associated passage 184 before striking the print media.

The body member 182 is mounted in spaced relationship relative to the nozzle assemblies 110 by limbs or struts 186. One of the struts 186 has air inlet openings 188 defined therein.

In use, when the array 114 is in operation, air is charged through the inlet openings 188 to be forced through the passages 184 together with ink travelling through the passages 184.

The ink is not entrained in the air as the air is charged through the passages 184 at a different velocity from that of the ink droplets 164. For example, the ink droplets 164 are ejected from the nozzles 122 at a velocity of approximately 3 m/s . The air is charged through the passages 184 at a velocity of approximately 1 m/s.

The purpose of the air is to maintain the passages 184 clear of foreign particles. A danger exists that these foreign particles, such as dust particles, could fall onto the nozzle assemblies 110 adversely affecting their operation. With the provision of the air inlet openings 88 in the nozzle guard 180 this problem is, to a large extent, obviated.

Referring now to FIGS. 24 to 26 of the drawings, a process for manufacturing the nozzle assemblies 110 is described.

Starting with the silicon substrate or wafer 116, the dielectric layer 118 is deposited on a surface of the wafer 116. The dielectric layer 118 is in the form of approximately 1.5 microns of CVD oxide. Resist is spun on to the layer 118 and the layer 118 is exposed to mask 200 and is subsequently developed.

After being developed, the layer 118 is plasma etched down to the silicon layer 116. The resist is then stripped and the layer 118 is cleaned. This step defines the ink inlet aperture 142.

Figure 24A:
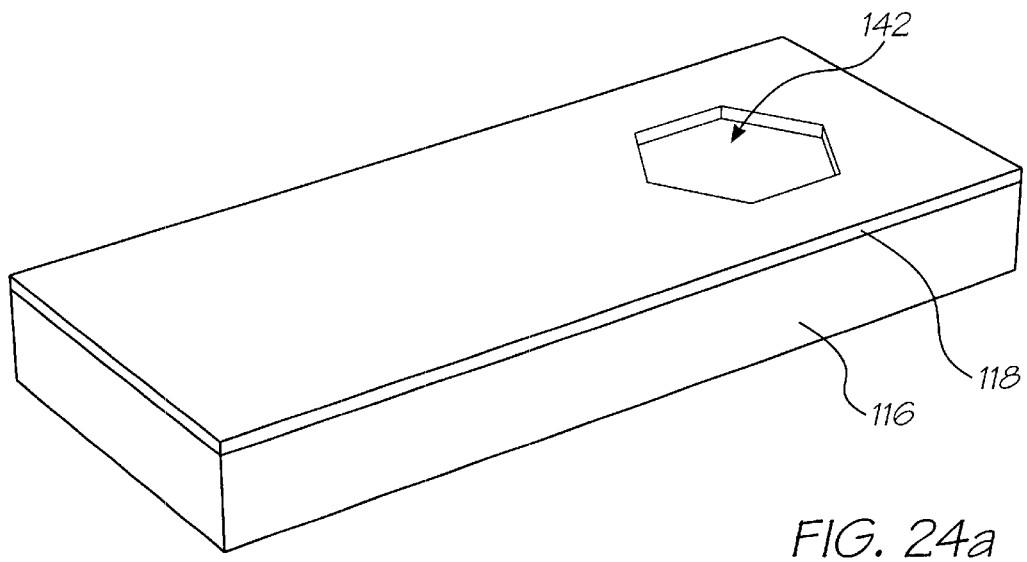
FIGS. 24a to 24r show three-dimensional views of steps in the manufacture of a nozzle assembly of an ink jet printhead.
Figure 25A:
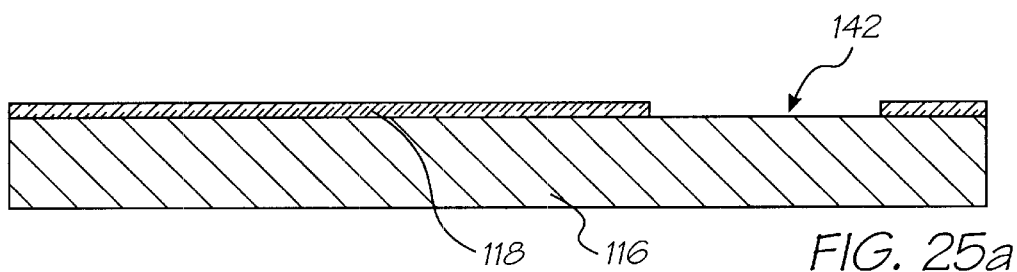
FIGS. 25a to 25r show sectional side views of the manufacturing steps.
Figure 26A:
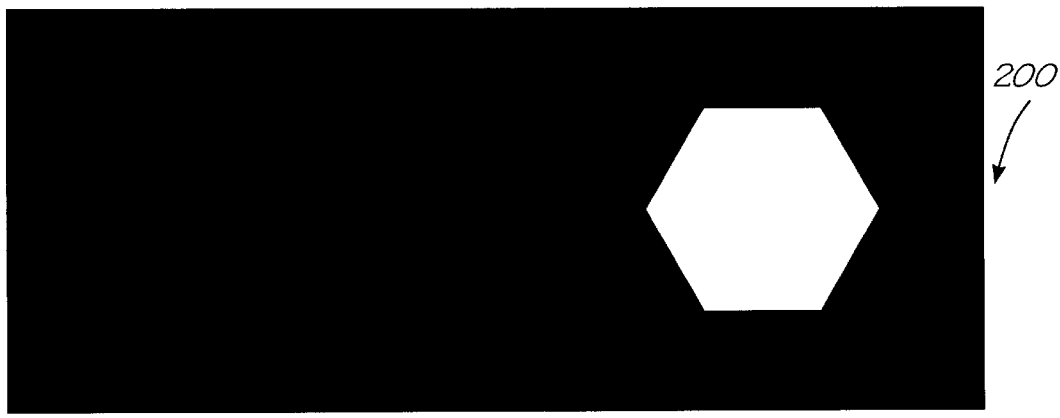
FIGS. 26a to 26k show layouts of masks used in various steps in the manufacturing process.
Figure 24B:
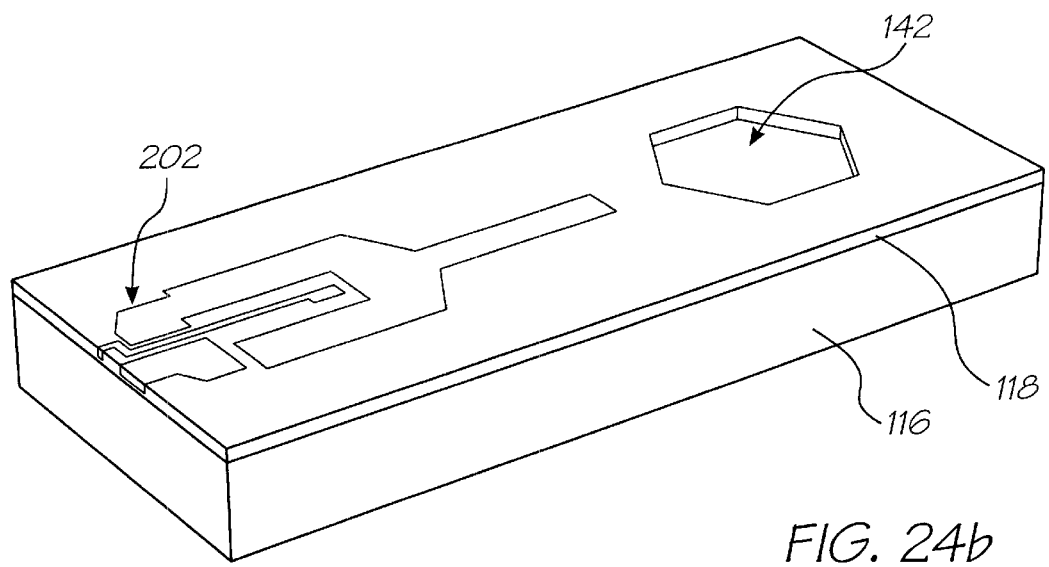
Figure 25B:
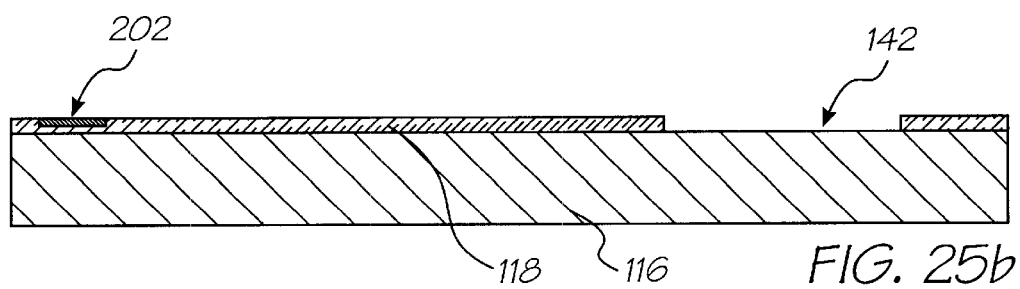
Figure 26B:
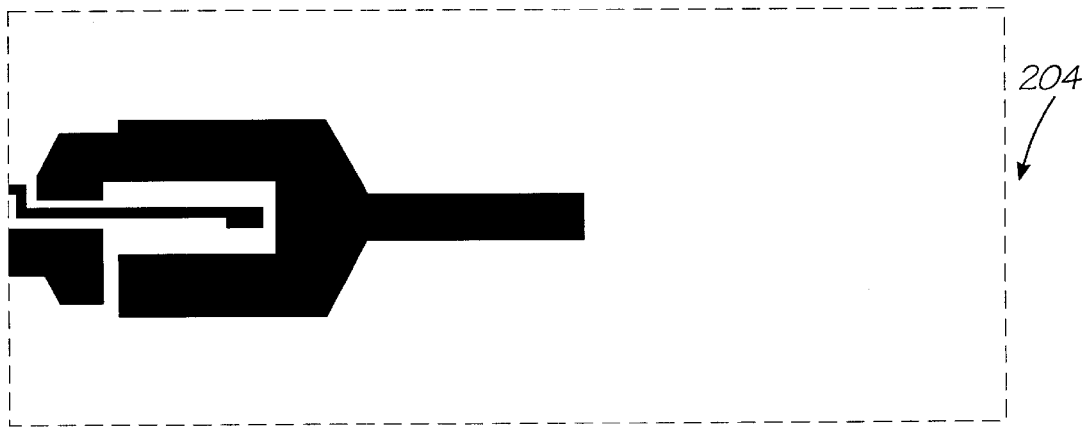
Figure 24C:
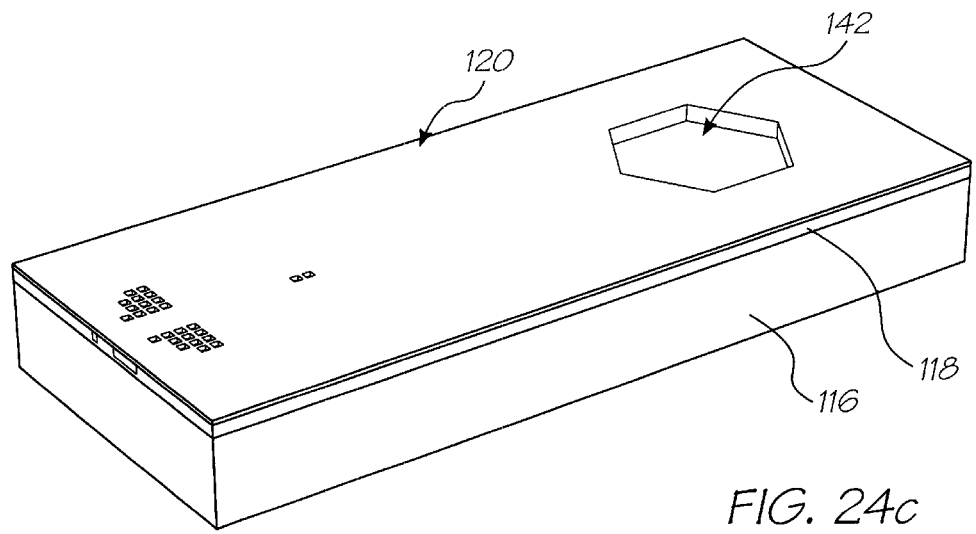
Figure 25C:
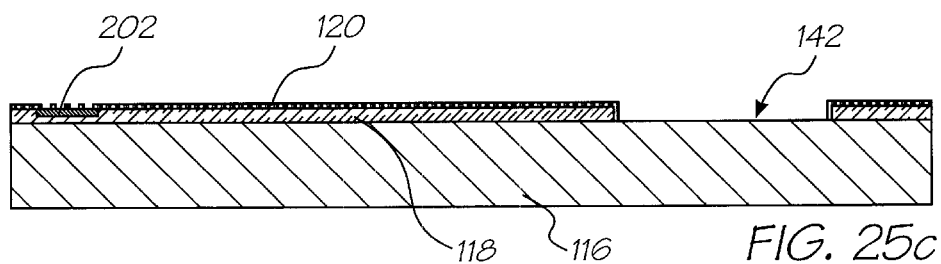
Figure 26C:
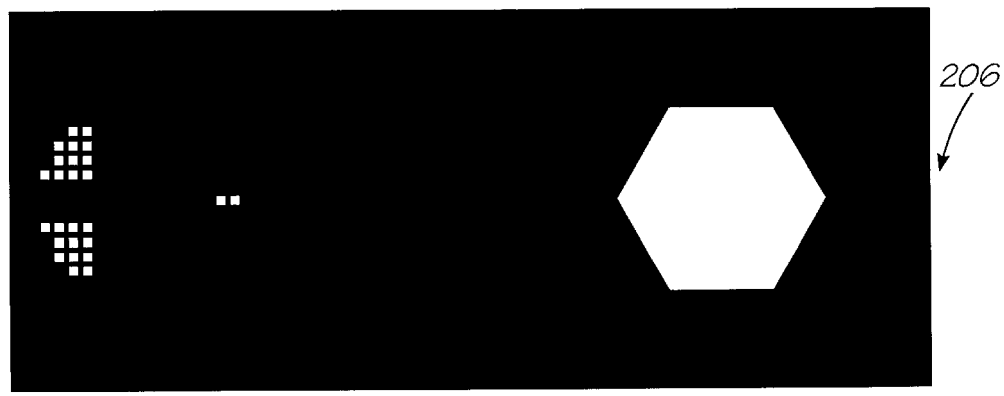
Figure 24D:
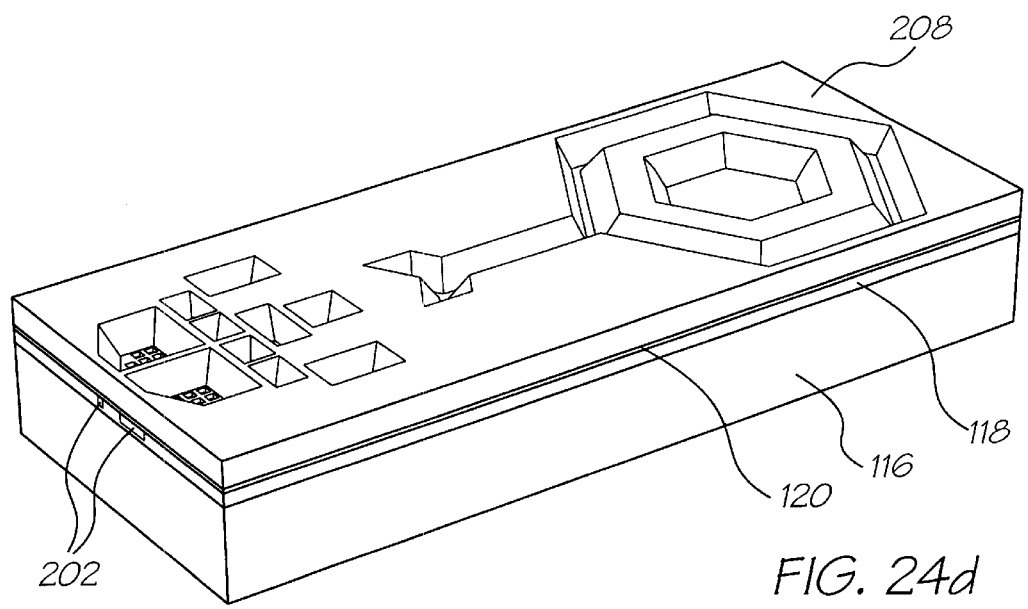
Figure 25D:
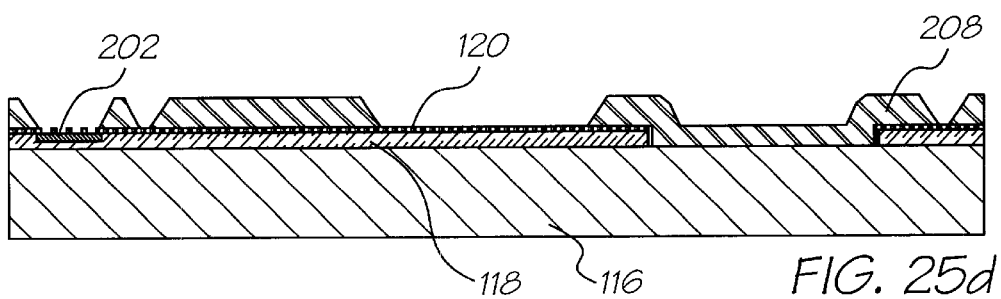
Figure 26D:
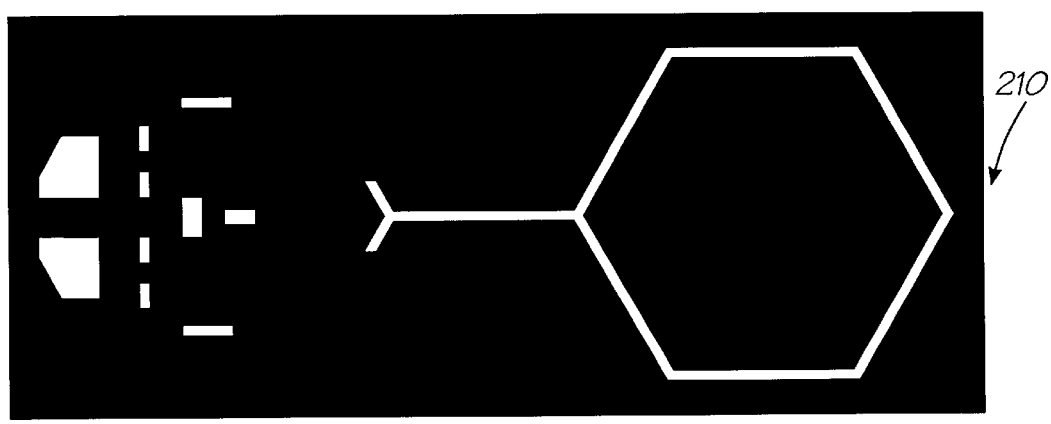

In FIG. 24*b* of the drawings, approximately 0.8 microns of aluminum 202 is deposited on the layer 118. Resist is spun on and the aluminum 202 is exposed to mask 204 and developed. The aluminum 202 is plasma etched down to the oxide layer 118, the resist is stripped and the device is cleaned. This step provides the bond pads and interconnects to the ink jet actuator 128. This interconnect is to an NMOS drive transistor and a power plane with connections made in the CMOS layer (not shown).

Approximately 0.5 microns of PECVD nitride is deposited as the CMOS passivation layer 120. Resist is spun on and the layer 120 is exposed to mask 206 whereafter it is developed. After development, the nitride is plasma etched down to the aluminum layer 202 and the silicon layer 116 in the region of the inlet aperture 142. The resist is stripped and the device cleaned.

A layer 208 of a sacrificial material is spun on to the layer 120. The layer 208 is 6 microns of photo-sensitive polyimide or approximately 4 $\mu$m of high temperature resist. The layer 208 is softbaked and is then exposed to mask 210 whereafter it is developed. The layer 208 is then hardbaked at 400° C. for one hour where the layer 208 is comprised of polyimide or at greater than 300° C. where the layer 208 is high temperature resist. It is to be noted in the drawings that the pattern-dependent distortion of the polyimide layer 208 caused by shrinkage is taken into account in the design of the mask 210.

Figure 24E:
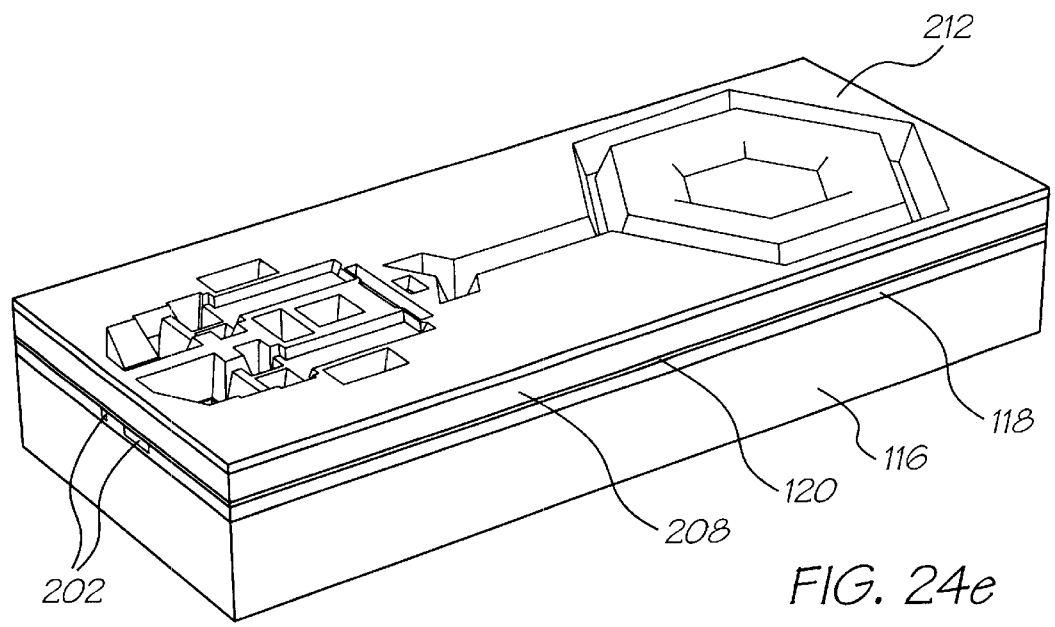
Figure 25E:
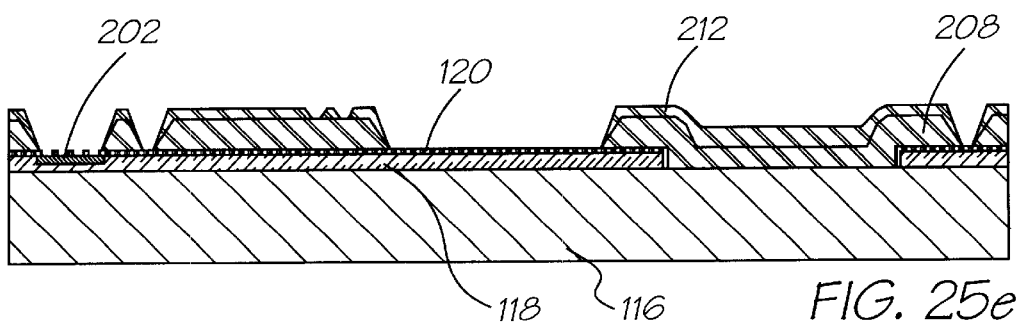
Figure 26E:
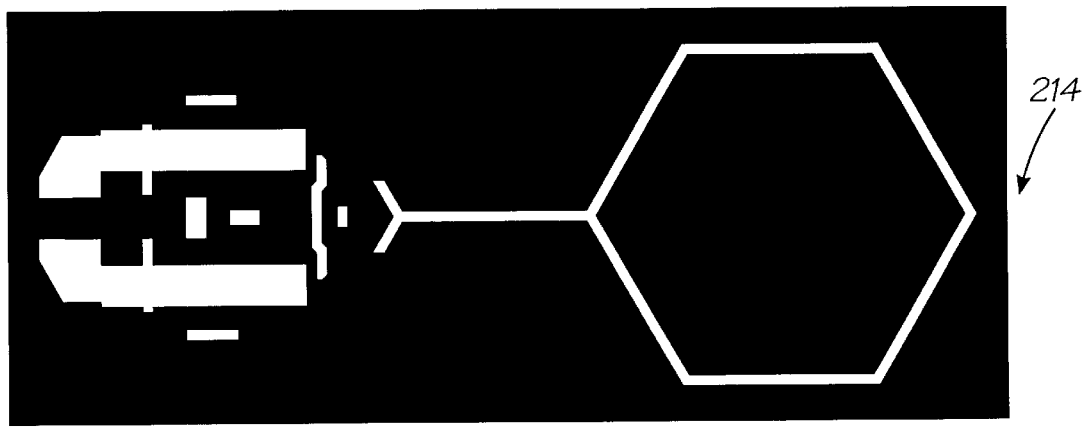
Figure 24F:
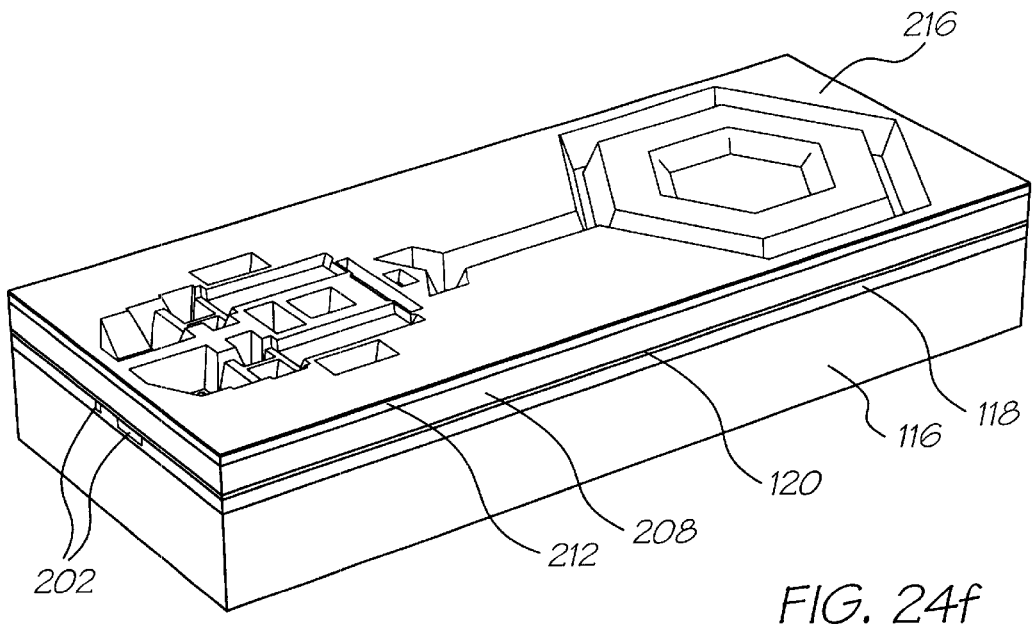
Figure 25F:
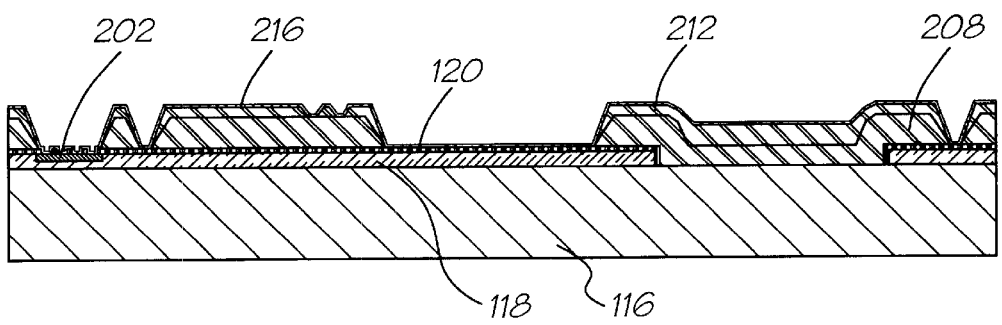
Figure 24G:
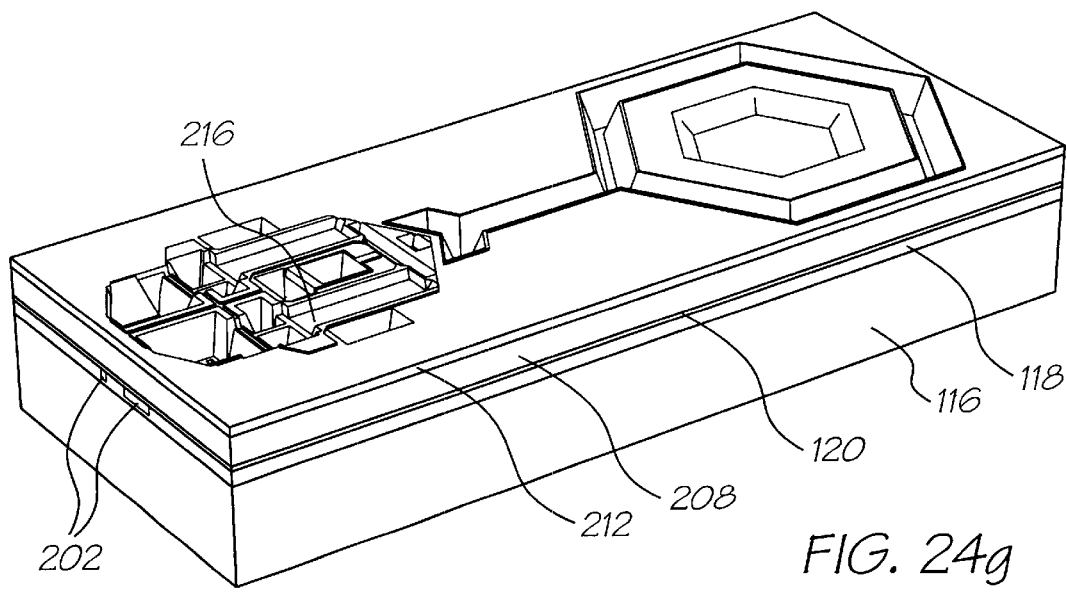
Figure 25G:
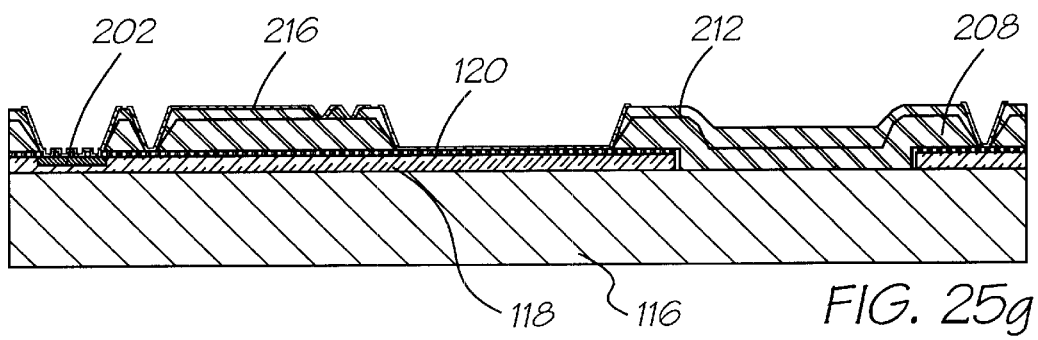
Figure 26F:
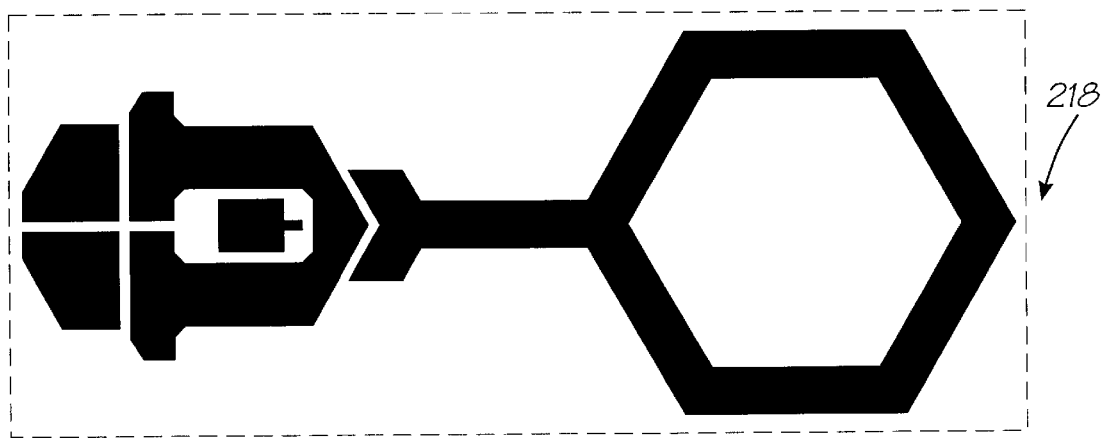
Figure 24H:
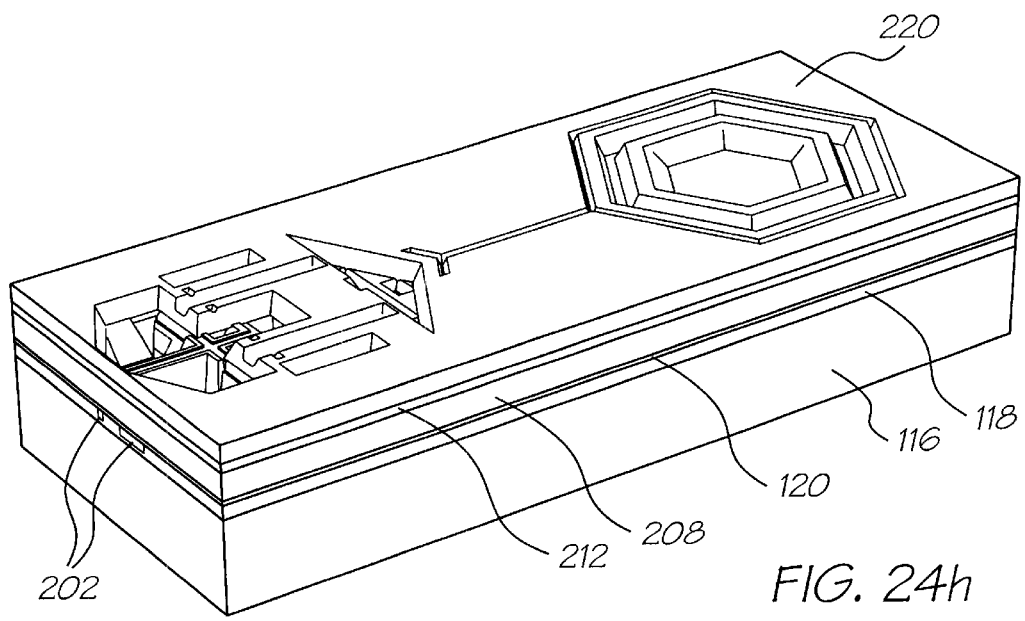
Figure 25H:
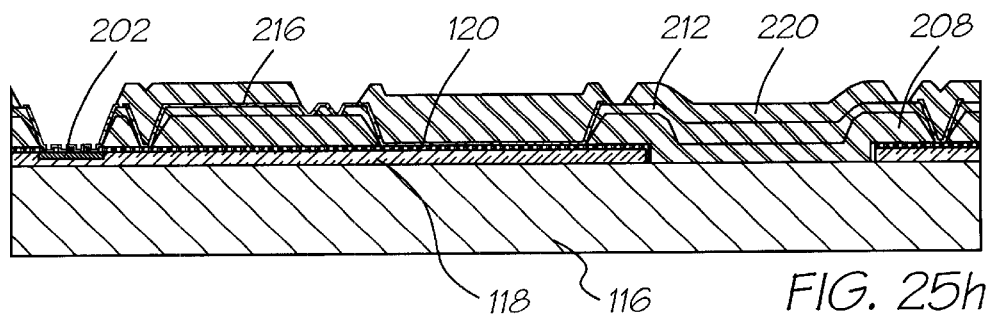
Figure 26G:
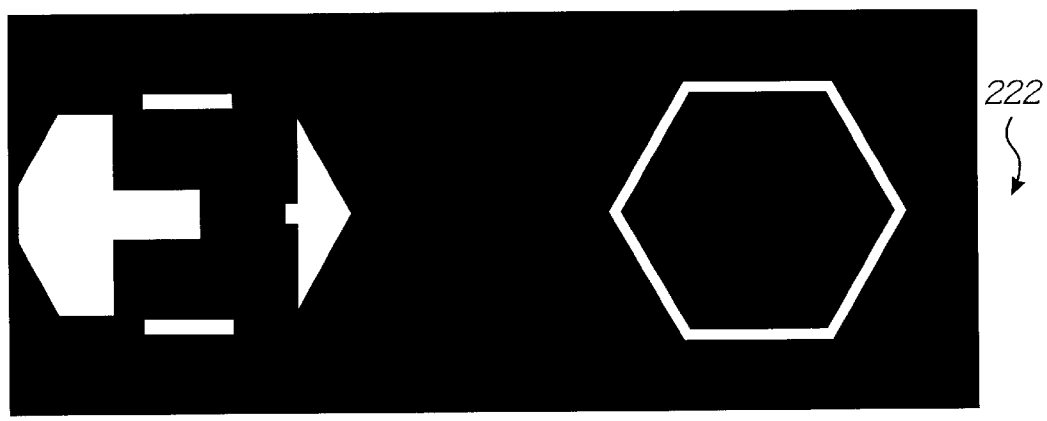
Figure 24I:
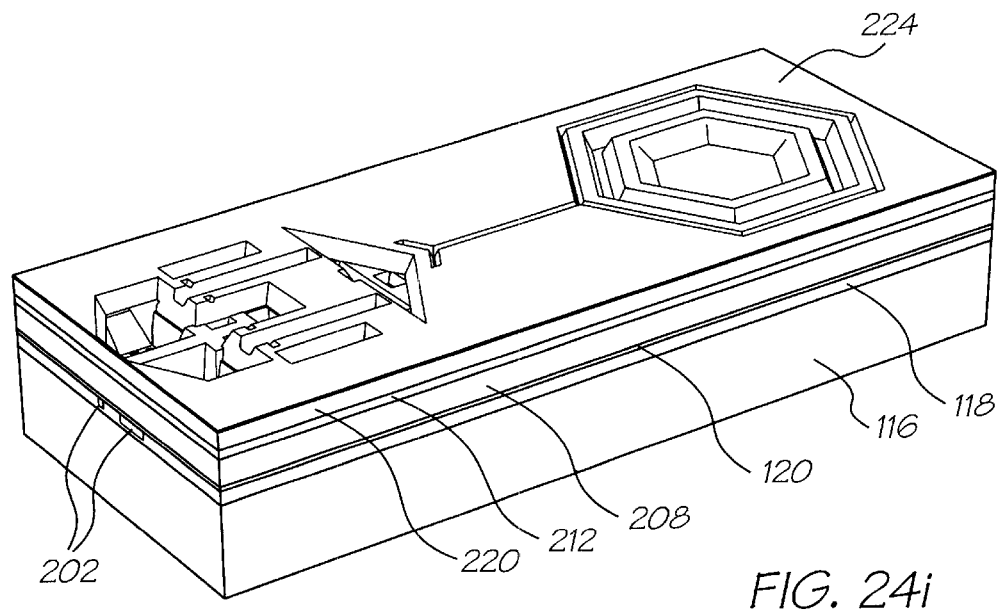
Figure 25I:
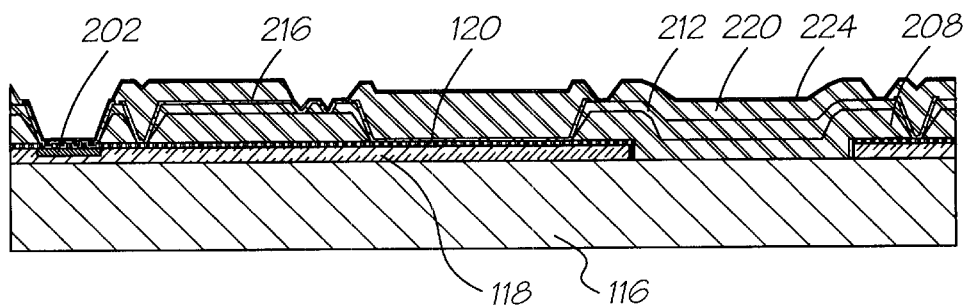
Figure 24J:
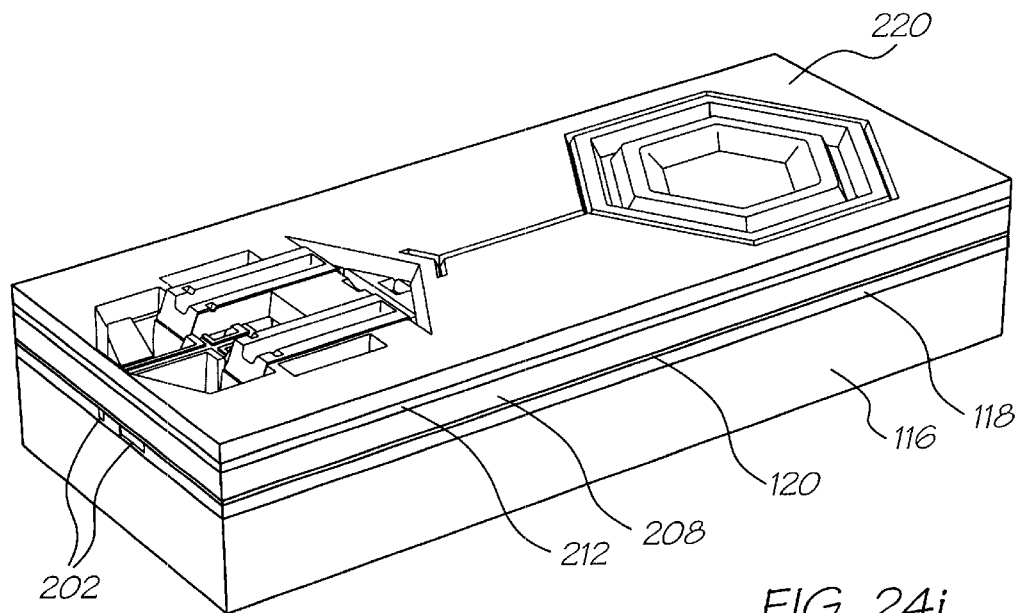
Figure 25J:
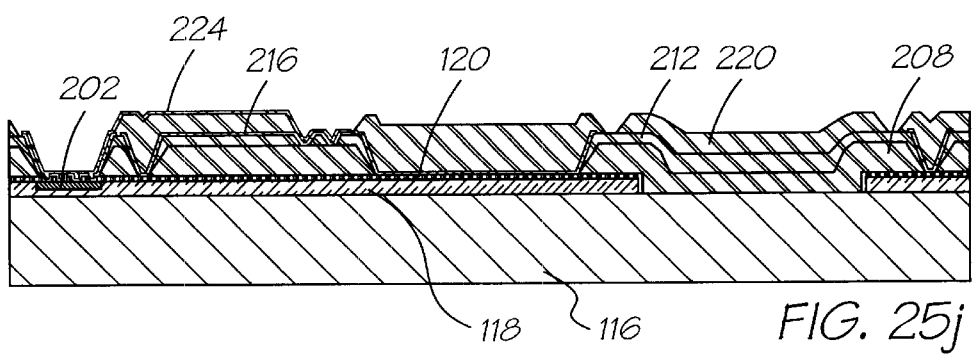
Figure 26H:
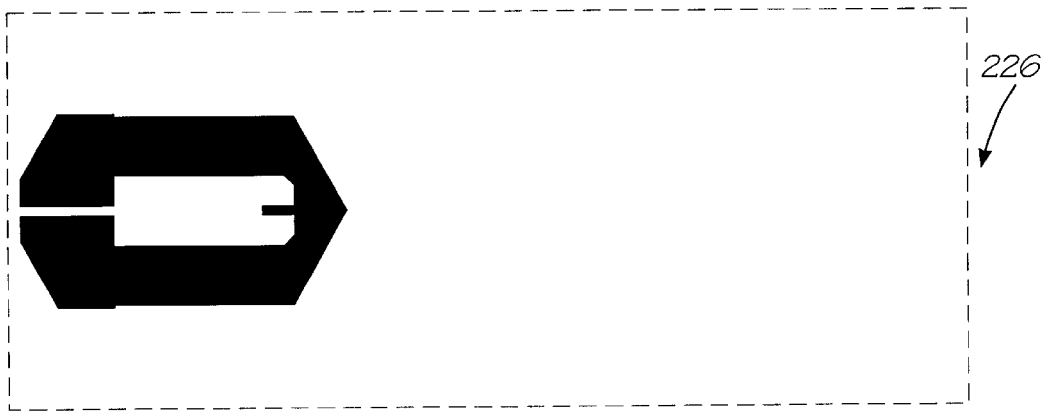
Figure 24K:
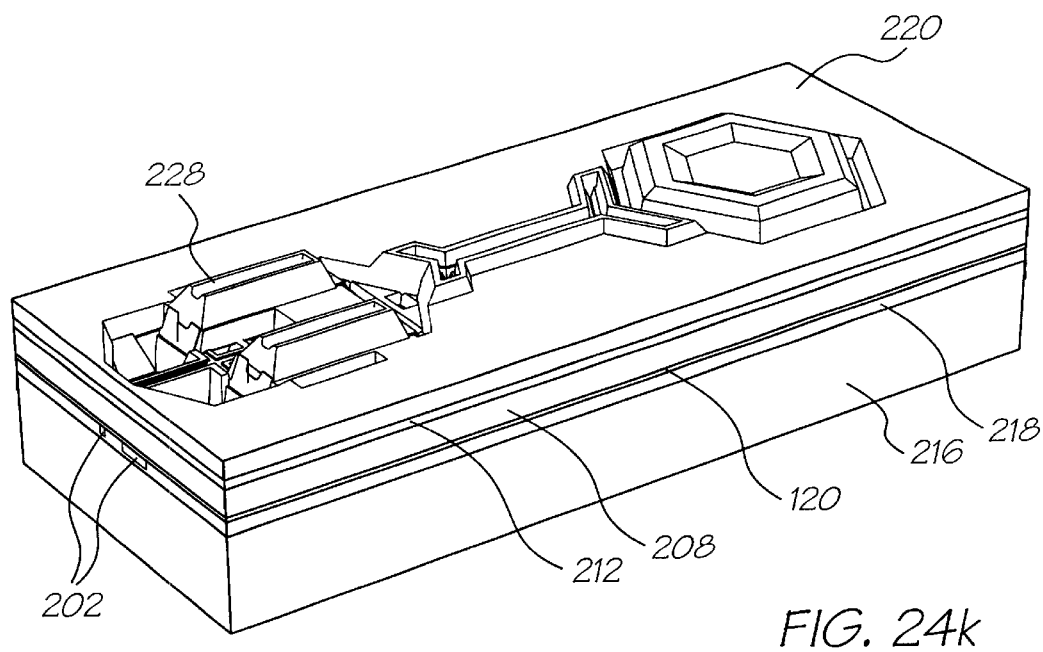
Figure 25K:
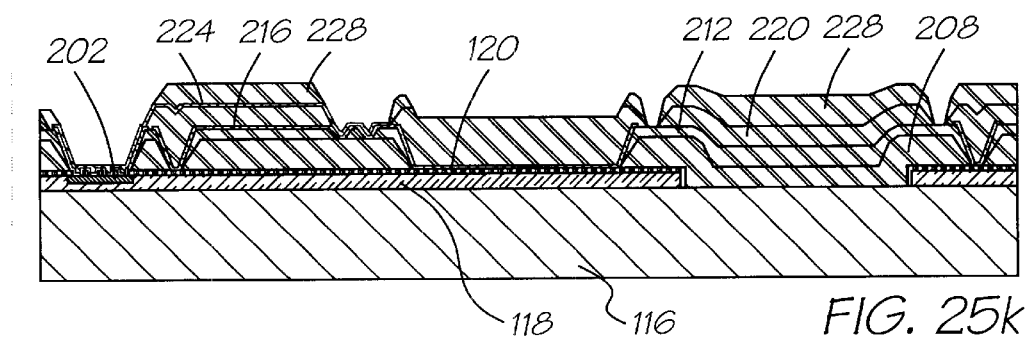
Figure 26I:
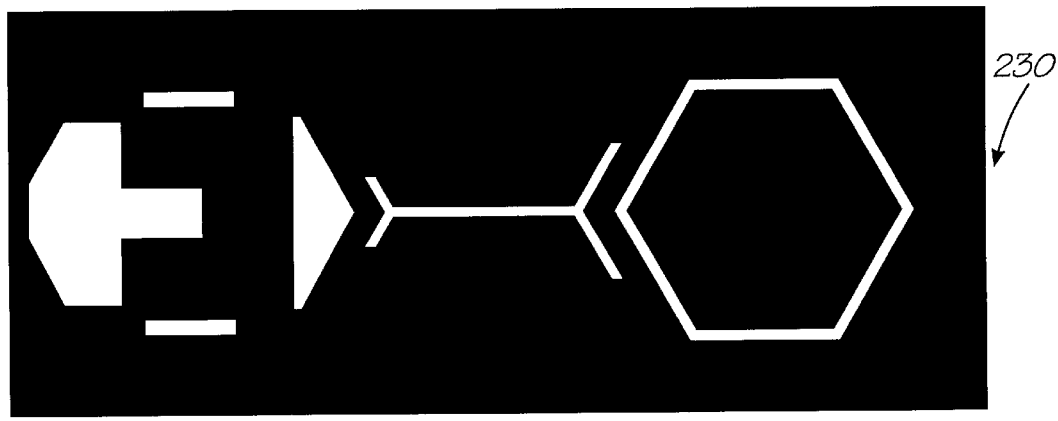
Figure 24I:
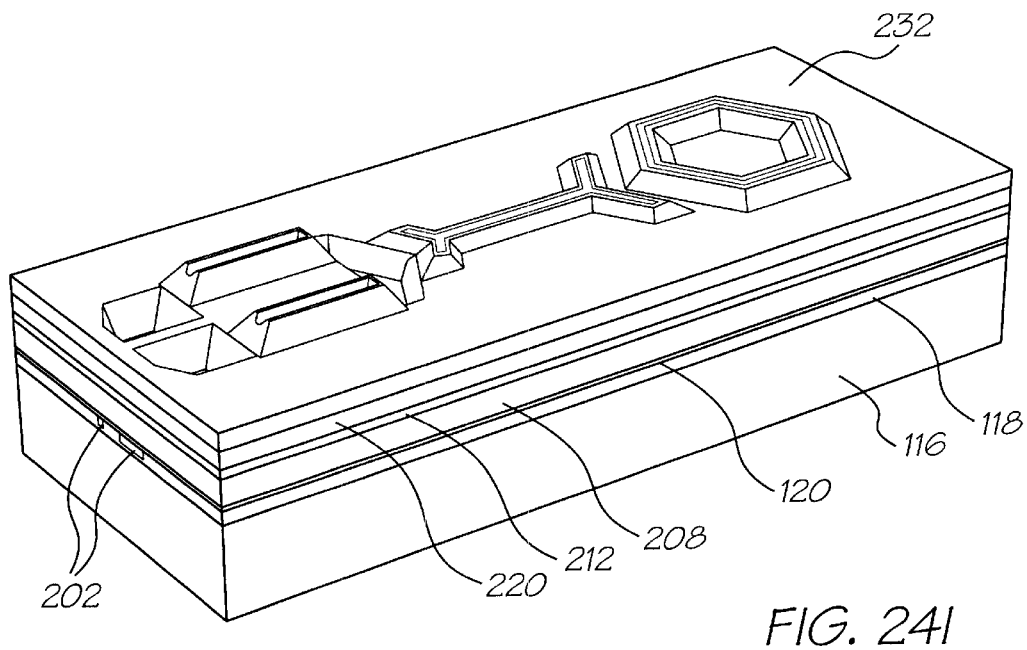
Figure 25I:
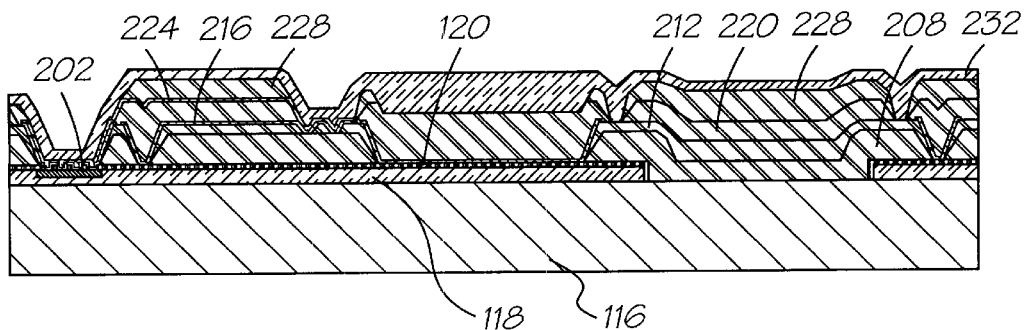
Figure 24M:
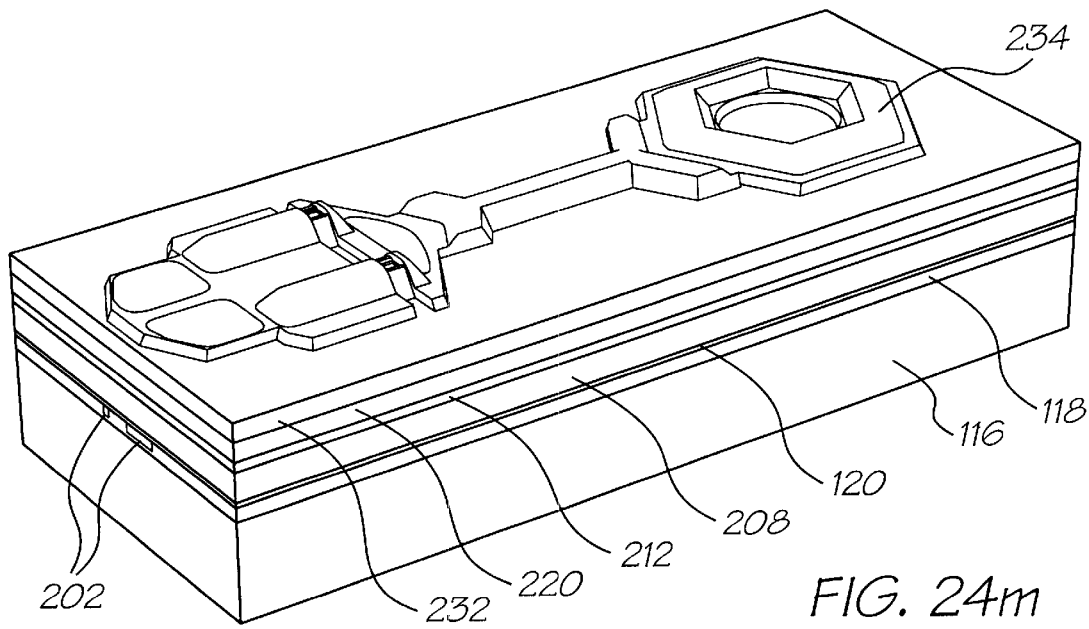
Figure 25M:
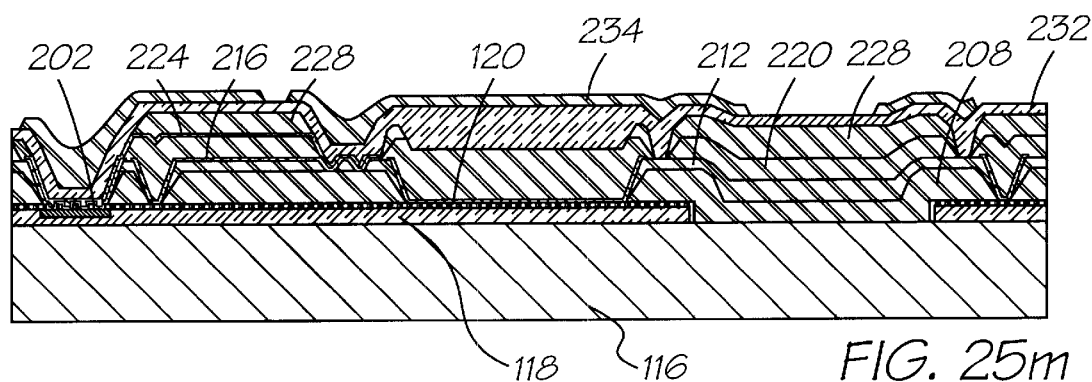
Figure 26J:
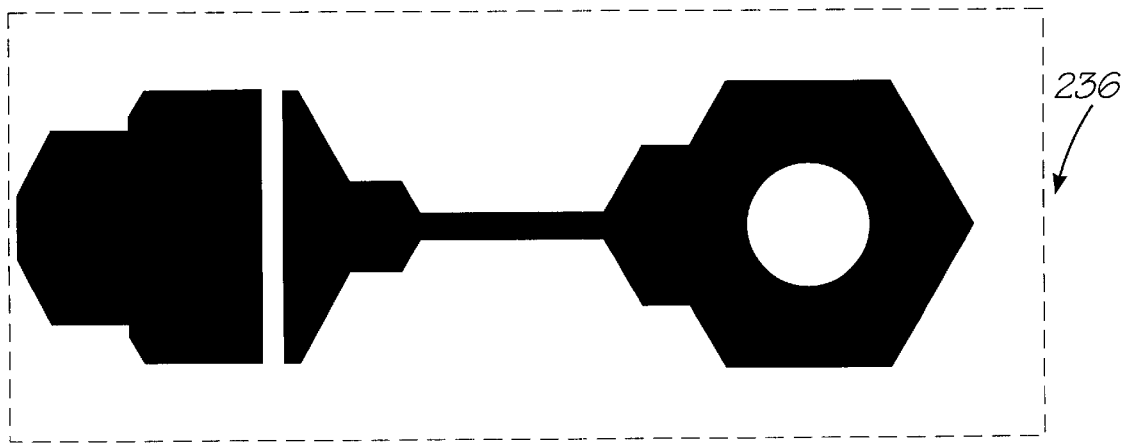
Figure 24N:
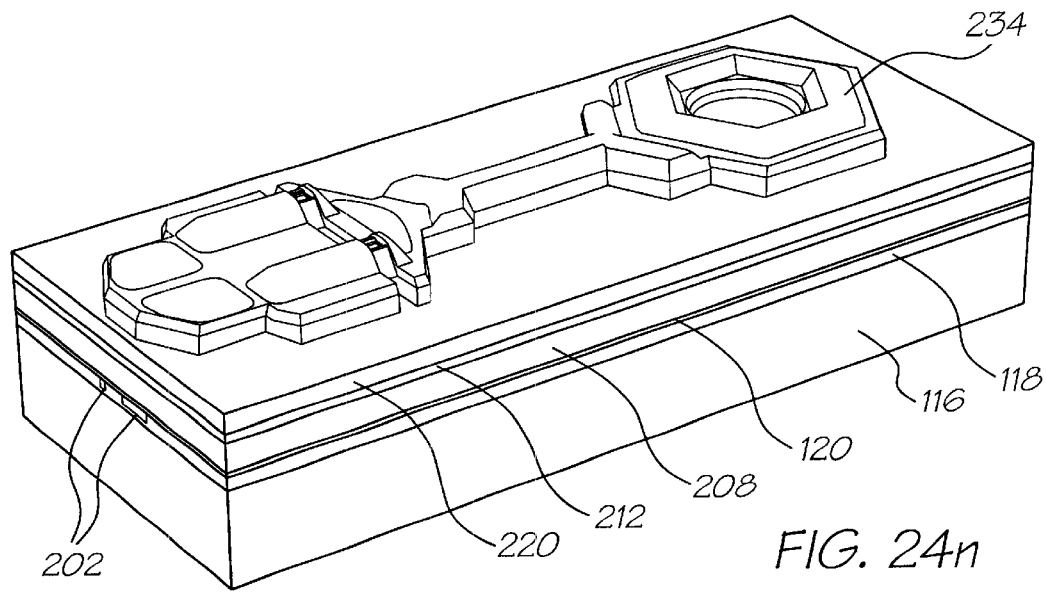
Figure 25N:
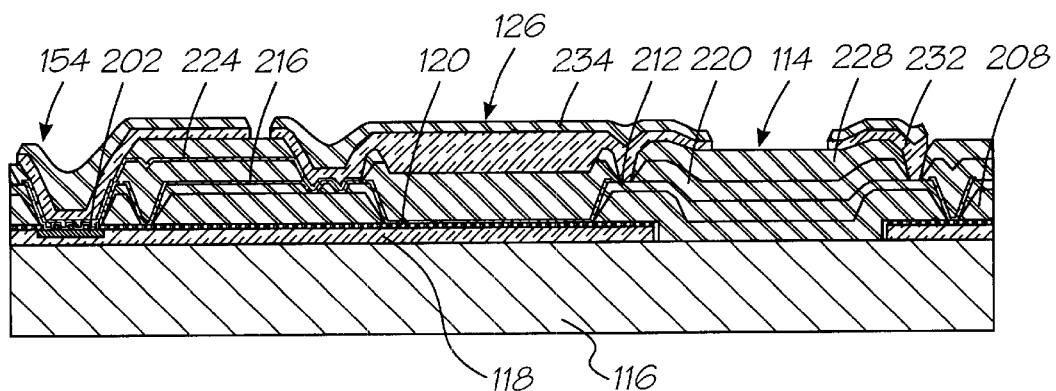
Figure 24O:
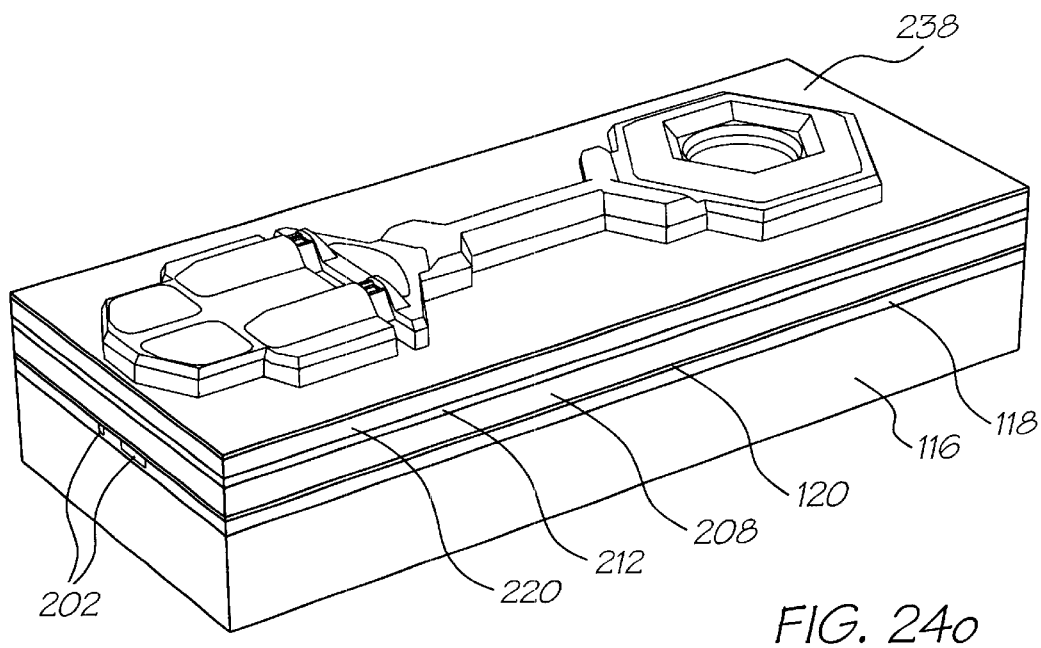
Figure 25O:
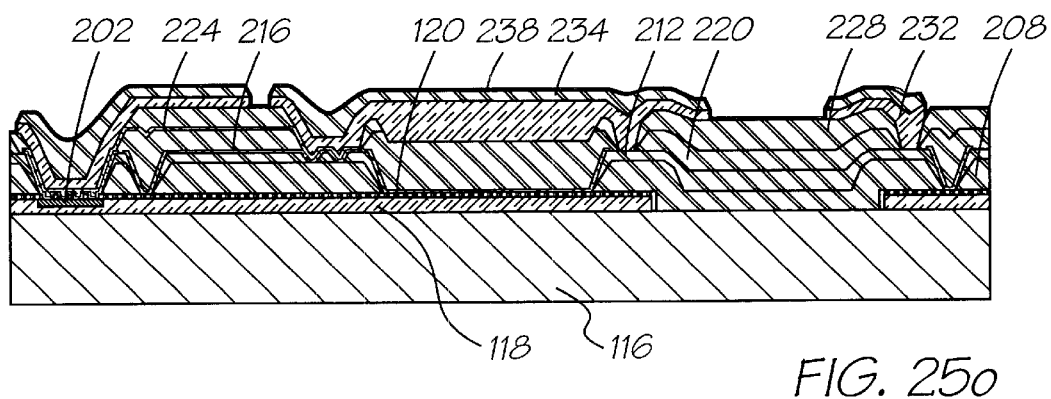

In the next step, shown in FIG. 24*e* of the drawings, a second sacrificial layer 212 is applied. The layer 212 is either 2 pum of photo-sensitive polyimide which is spun on or approximately 1.3 $\mu$m of high temperature resist. The layer 212 is softbaked and exposed to mask 214. After exposure to the mask 214, the layer 212 is developed. In the case of the layer 212 being polyimide, the layer 212 is hardbaked at 400° C. for approximately one hour. Where the layer 212 is resist, it is hardbaked at greater than 300° C. for approximately one hour.

A 0.2 micron multi-layer metal layer 216 is then deposited. Part of this layer 216 forms the passive beam 160 of the actuator 128.

The layer 216 is formed by sputtering 1000 Å of titanium nitride (TiN) at around 300° C. followed by sputtering 50 Å of tantalum nitride (TaN). A further 1000 Å of TiN is sputtered on followed by 50 Å of TaN and a further 1000 Å of TiN.

Other materials which can be used instead of TiN are $TiB_2$, $MoSi_2$ or (Ti, Al)N.

The layer 216 is then exposed to mask 218, developed and plasma etched down to the layer 212 whereafter resist, applied for the layer 216, is wet stripped taking care not to remove the cured layers 208 or 212.

A third sacrificial layer 220 is applied by spinning on 4 $\mu$m of photo-sensitive polyimide or approximately 2.6 $\mu$m high temperature resist. The layer 220 is softbaked whereafter it is exposed to mask 222. The exposed layer is then developed followed by hardbaking. In the case of polyimide, the layer 220 is hardbaked at 400° C. for approximately one hour or at greater than 300° C. where the layer 220 comprises resist.

A second multi-layer metal layer 224 is applied to the layer 220. The constituents of the layer 224 are the same as the layer 216 and are applied in the same manner. It will be appreciated that both layers 216 and 224 are electrically conductive layers.

The layer 224 is exposed to mask 226 and is then developed. The layer 224 is plasma etched down to the polyimide or resist layer 220 whereafter resist applied for the layer 224 is wet stripped taking care not to remove the cured layers 208, 212 or 220. It will be noted that the remaining part of the layer 224 defines the active beam 158 of the actuator 128.

A fourth sacrificial layer 228 is applied by spinning on 4 $\mu$m of photo-sensitive polyimide or approximately 2.6 $\mu$m of high temperature resist. The layer 228 is softbaked, exposed to the mask 230 and is then developed to leave the island portions as shown in FIG. 9*k* of the drawings. The remaining portions of the layer 228 are hardbaked at 400° C. for approximately one hour in the case of polyimide or at greater than 300° C. for resist.

As shown in FIG. 24*l* of the drawing a high Young's modulus dielectric layer 232 is deposited. The layer 232 is constituted by approximately 1 $\mu$m of silicon nitride or aluminum oxide. The layer 232 is deposited at a temperature below the hardbaked temperature of the sacrificial layers 208, 212, 220, 228. The primary characteristics required for this dielectric layer 232 are a high elastic modulus, chemical inertness and good adhesion to TiN.

A fifth sacrificial layer 234 is applied by spinning on 2 $\mu$m of photo-sensitive polyimide or approximately 1.3 $\mu$m of high temperature resist. The layer 234 is softbaked, exposed to mask 236 and developed. The remaining portion of the layer 234 is then hardbaked at 400° C. for one hour in the case of the polyimide or at greater than 300° C. for the resist.

The dielectric layer 232 is plasma etched down to the sacrificial layer 228 taking care not to remove any of the sacrificial layer 234.

This step defines the nozzle opening 124, the lever arm 126 and the anchor 154 of the nozzle assembly 110.

A high Young's modulus dielectric layer 238 is deposited. This layer 238 is formed by depositing 0.2 $\mu$m of silicon nitride or aluminum nitride at a temperature below the hardbaked temperature of the sacrificial layers 208, 212, 220 and 228.

Figure 24P:
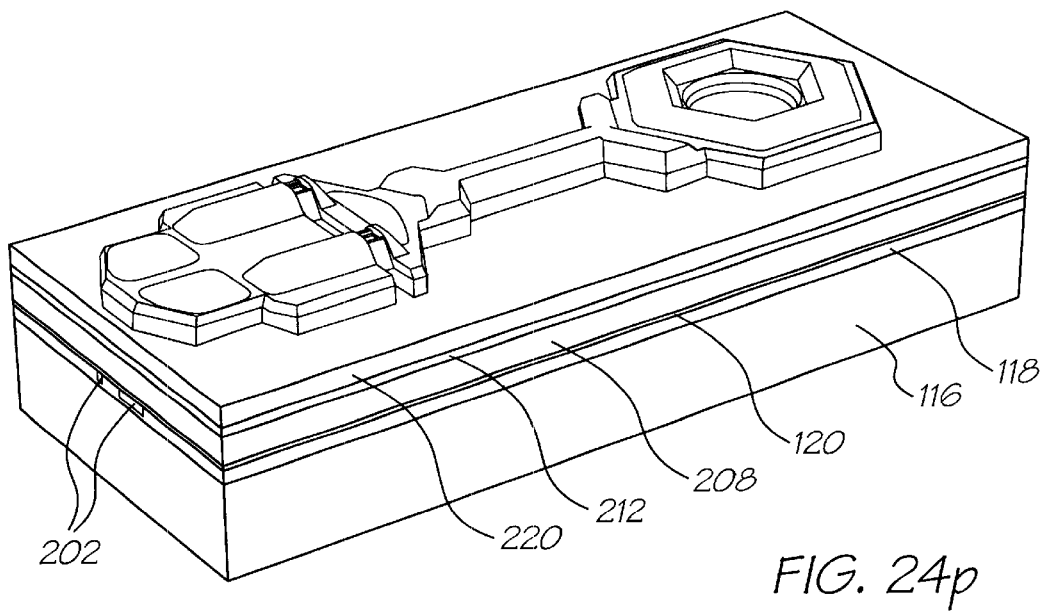
Figure 25P:
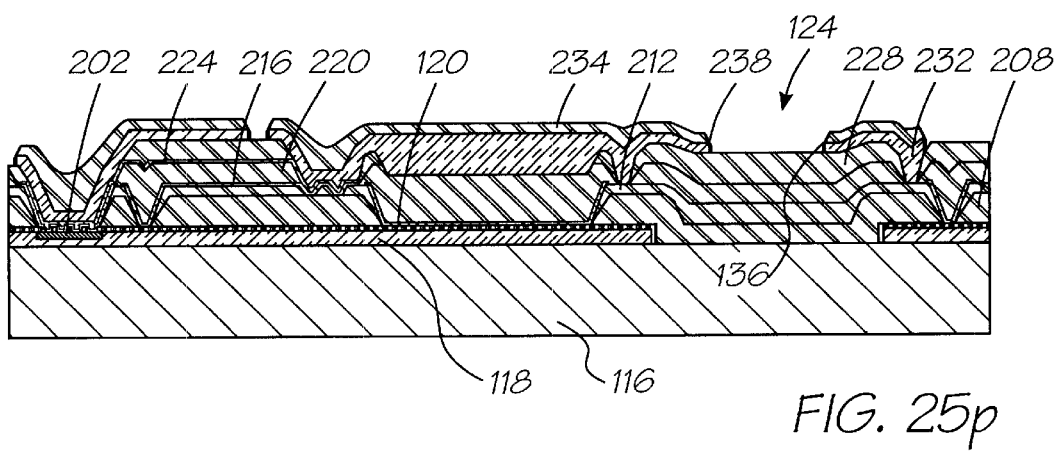
Figure 24Q:
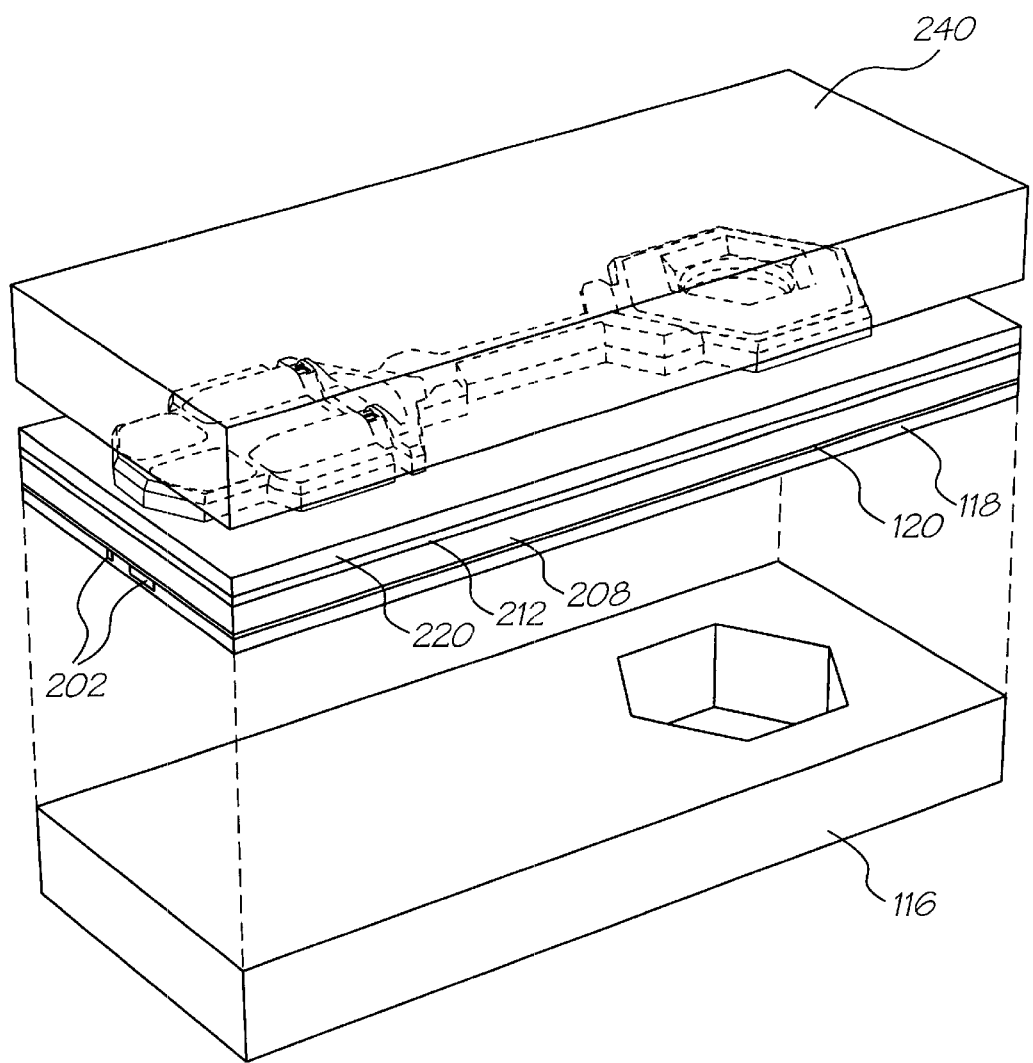
Figure 25Q:
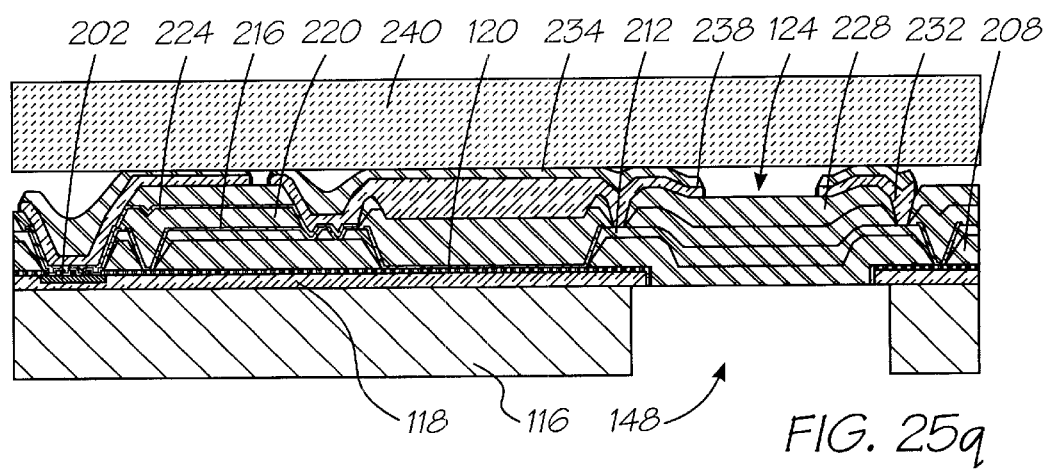
Figure 26K:
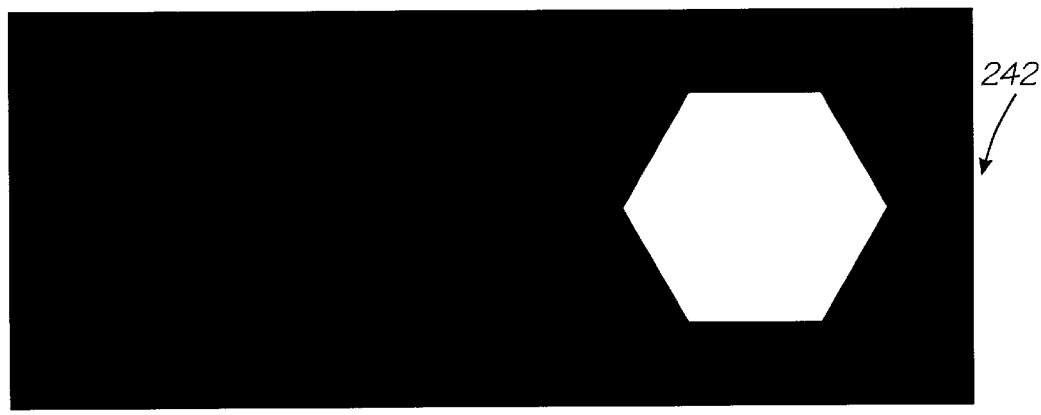

Then, as shown in FIG. 24*p* of the drawings, the layer 238 is anisotropically plasma etched to a depth of 0.35 microns. This etch is intended to clear the dielectric from all of the surface except the side walls of the dielectric layer 232 and the sacrificial layer 234. This step creates the nozzle rim 136 around the nozzle opening 124 which "pins" the meniscus of ink, as described above.

An ultraviolet (UV) release tape 240 is applied. 4 µm of resist is spun on to a rear of the silicon wafer 116. The wafer 116 is exposed to mask 242 to back etch the wafer 116 to define the ink inlet channel 148. The resist is then stripped from the wafer 116.

Figure 24R:
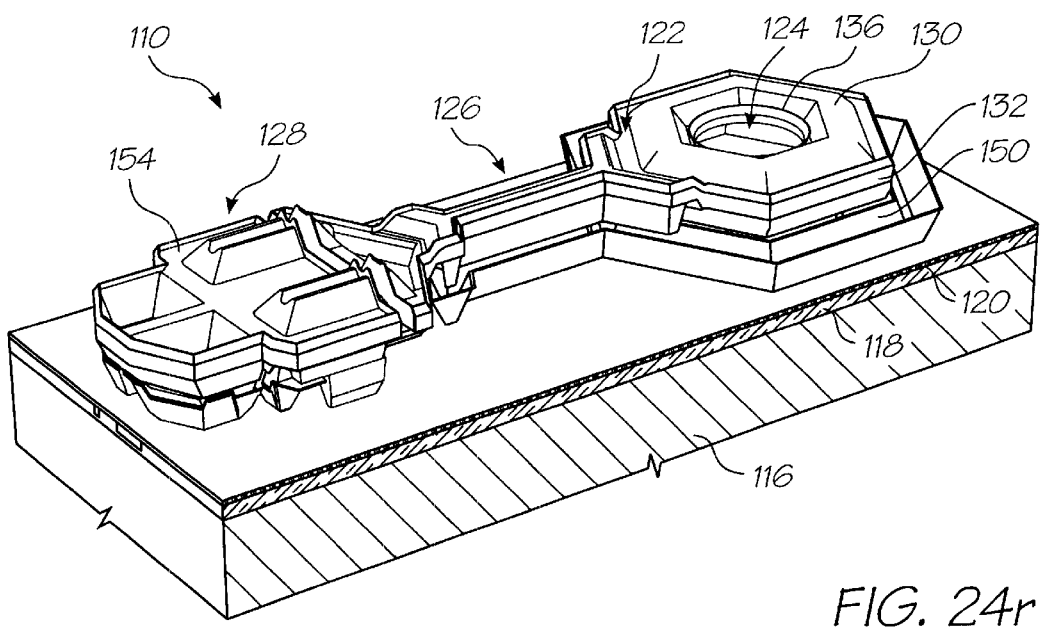
Figure 25R:
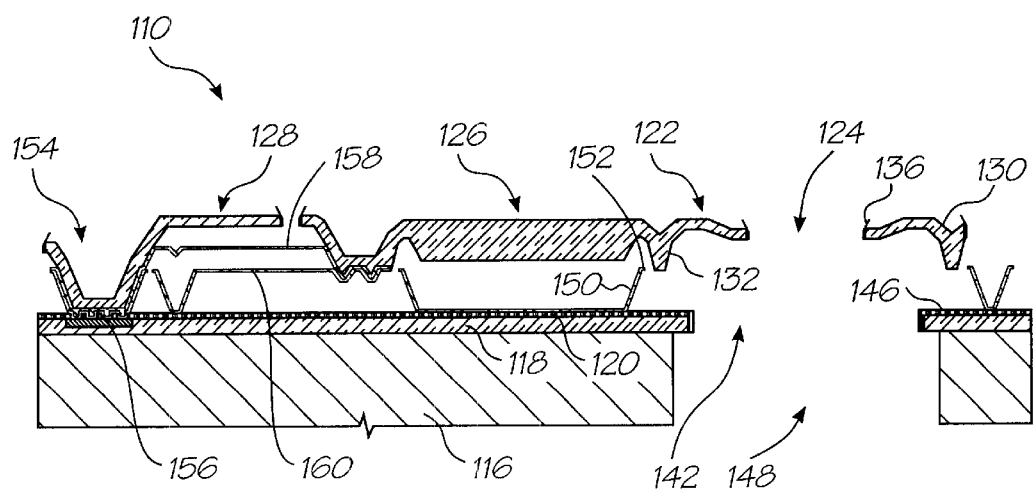
Figure 27A:
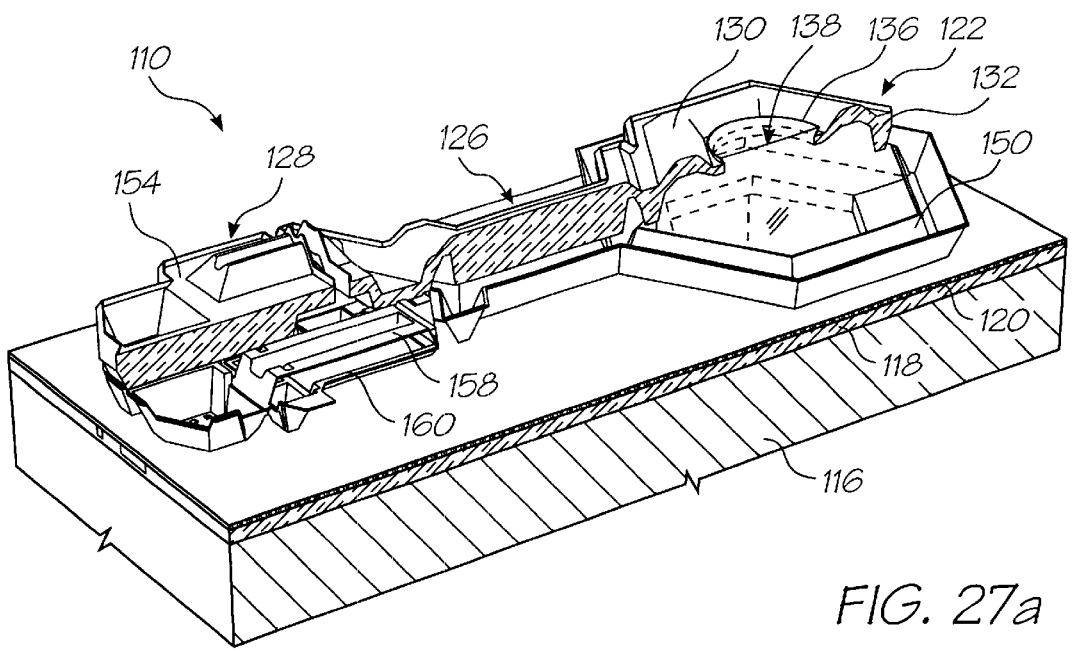
FIGS. 27a to 27c show three dimensional views of an operation of the nozzle assembly manufactured according to the method of FIGS. 24 and 25.
Figure 28A:
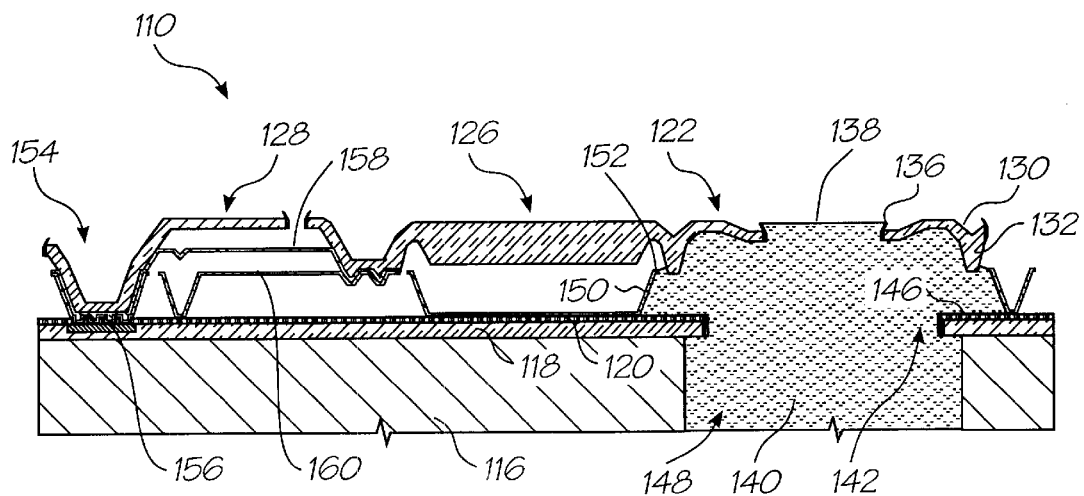
FIGS. 28a to 28c show sectional side views of an operation of the nozzle assembly manufactured according to the method of FIGS. 24 and 25.
Figure 27B:
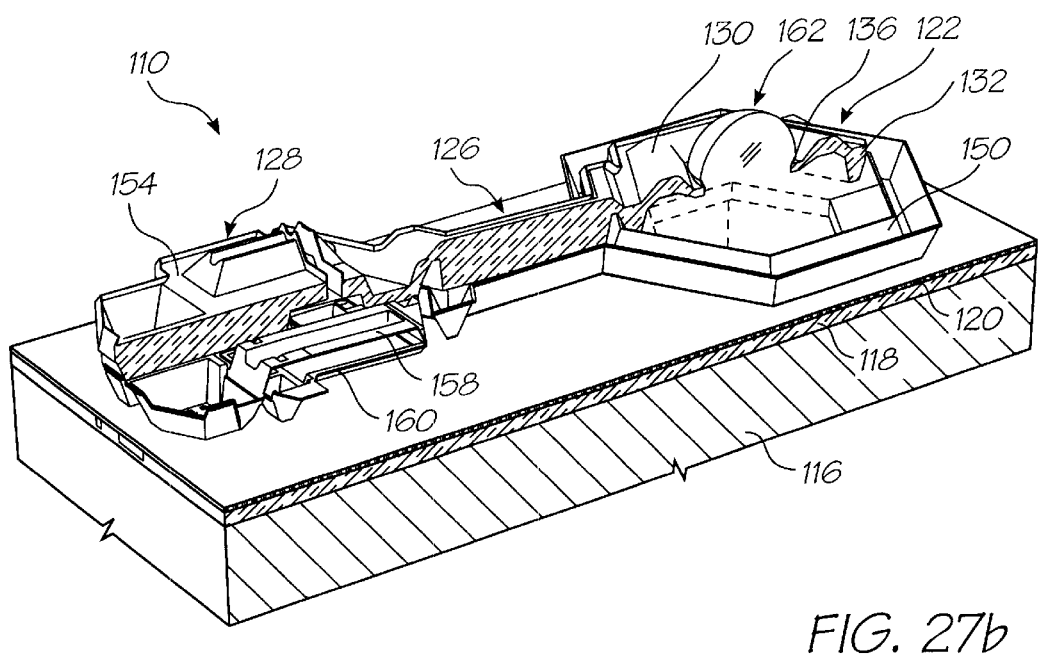
Figure 28B:
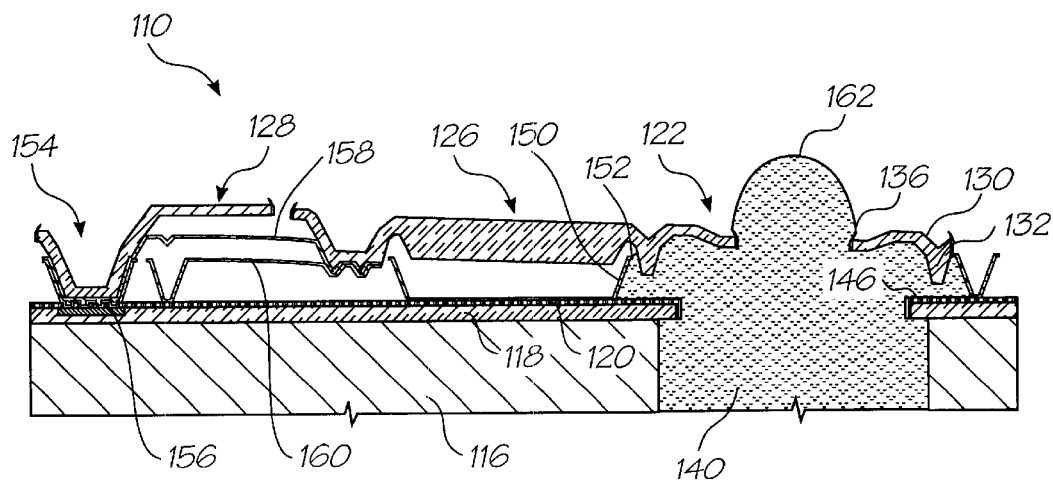
Figure 27C:
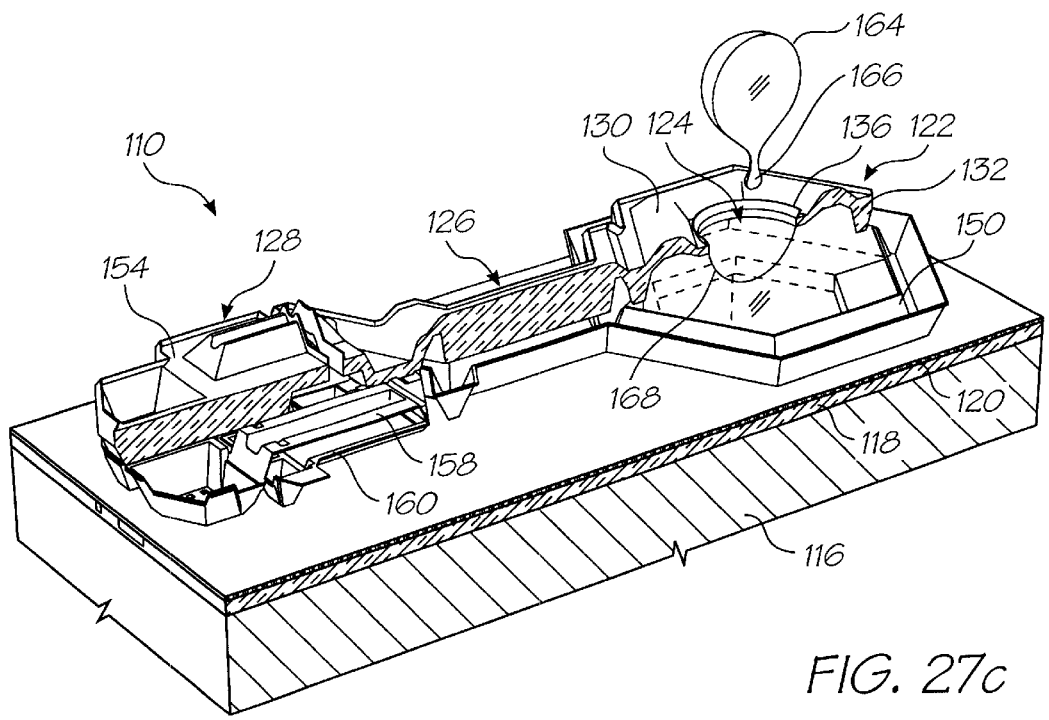
Figure 28C:
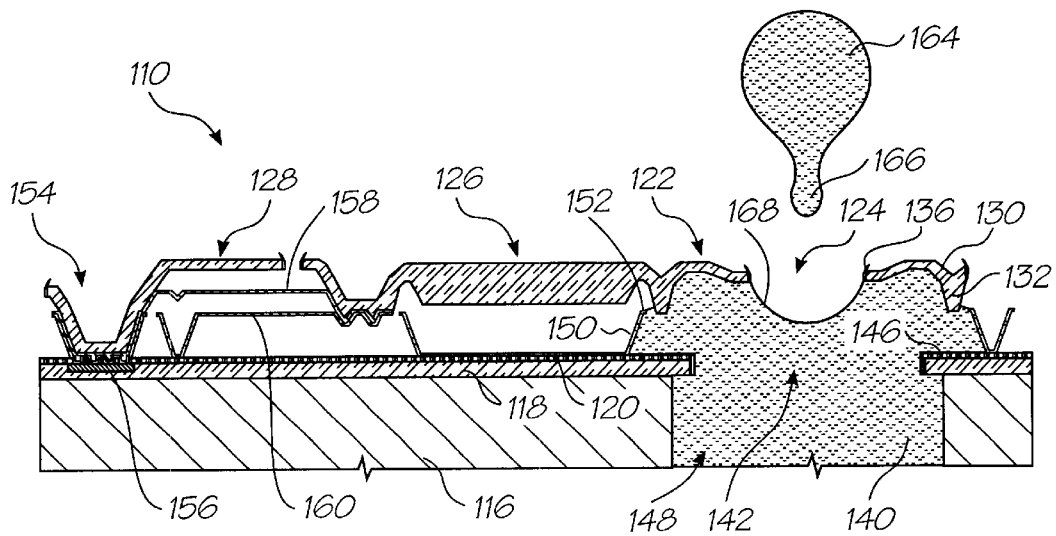

A further UV release tape (not shown) is applied to a rear of the wafer 16 and the tape 240 is removed. The sacrificial layers 208, 212, 220, 228 and 234 are stripped in oxygen plasma to provide the final nozzle assembly 110 as shown in FIGS. 24r and 25r of the drawings. For ease of reference, the reference numerals illustrated in these two drawings are the same as those in FIG. 17 of the drawings to indicate the relevant parts of the nozzle assembly 110. FIGS. 27 and 28 show the operation of the nozzle assembly 110, manufactured in accordance with the process described above with reference to FIGS. 24 and 25, and these figures correspond to FIGS. 18 to 20 of the drawings.

The presently disclosed ink jet printing technology is potentially suited to a wide range of printing system including: color and monochrome office printers, short run digital printers, high speed digital printers, offset press supplemental printers, low cost scanning printers high speed pagewidth printers, notebook computers with in-built pagewidth printers, portable color and monochrome printers, color and monochrome copiers, color and monochrome facsimile machines, combined printer, facsimile and copying machines, label printers, large format plotters, photograph copiers, printers for digital photographic "minilabs", video printers, PHOTO CD (PHOTO CD is a registered trademark of the Eastman Kodak Company) printers, portable printers for PDAs, wallpaper printers, indoor sign printers, billboard printers, fabric printers, camera printers and fault tolerant commercial printer arrays.

It would be appreciated by a person skilled in the art that numerous variations and/or modifications any be made to the present invention as shown in the specific embodiment without departing from the spirit or scope of the invention as broadly described. The present embodiment is, therefore, to be considered in all respects to be illustrative and not restrictive.

What is claimed is:

1. An ink jet nozzle assembly including a nozzle chamber having a nozzle, the chamber including a movable portion configured for movement to effect ejection of ink from the chamber via said nozzle, and a pair of actuating arms attached to or formed integrally with the movable portion, the arms effecting movement of said movable portion as a result of one of said arms being periodically hotter than the other said arm in use.

2. An ink jet nozzle assembly including: a nozzle chamber having an inlet in fluid communication with an ink reservoir and a nozzle through which ink from the chamber can be ejected;

the chamber including a fixed portion and a movable portion configured for relative movement in an ejection phase and alternate relative movement in a refill phase;

a pair of spaced apart actuating arms connected with the movable portion and undergoing differential thermal expansion upon heating to effect periodically said relative movement; and the inlet being positioned and dimensioned relative to the nozzle such that ink is ejected preferentially from the chamber through the nozzle in droplet form during the ejection phase, and ink is alternately drawn preferentially into the chamber from the reservoir through the inlet during the refill phase.

3. An assembly according to claim 2 wherein the movable portion includes the nozzle and the fixed portion is mounted on a substrate.

4. An assembly according to claim 2 wherein the fixed portion includes the nozzle mounted on a substrate and the movable portion includes an ejection paddle.

5. An assembly according to claim 4 wherein the arms extend between the paddle and the substrate.

6. An assembly according to claim 4 wherein the arms are located substantially outside the chamber.

7. An assembly according to claim 6 wherein the fixed portion includes a slot a sidewall of the chamber through which the arms are connected to the paddle.

8. An assembly according to claim 2 wherein the arms are located substantially within the chamber.

9. An assembly according to claim 2 wherein the arms are of substantially the same cross-sectional profile relative to one another.

10. An assembly according to claim 2 wherein the arms are of differing cross-sectional profile relative to one another.

11. An assembly according to claim 2 wherein the arms are heated simultaneously.

12. An assembly according to claim 2 wherein one arm is heated to a higher temperature than the other arm.

13. An assembly according to claim 2 wherein the arms are of substantially the same material composition relative to one another.

14. An assembly according to claim 2 wherein the arms are of substantially different material composition relative to one another.

15. An assembly according to claim 2 wherein the arms are substantially parallel to one another.

16. An assembly according to claim 2 wherein the arms are substantially non-parallel to one another.

17. An assembly according to claim 2, manufactured using micro-electro-mechanical systems (MEMS) techniques.

18. An assembly according to claim 2 wherein an effective volume of the chamber is reduced in said ejection phase and enlarged in said refill phase.

* * * * *